United States Patent
Saito et al.

(10) Patent No.: US 10,020,879 B2
(45) Date of Patent: Jul. 10, 2018

(54) OPTICAL TRANSMISSION APPARATUS, OPTICAL POWER MONITOR, AND METHOD OF MONITORING OPTICAL POWER

(71) Applicant: FUJITSU LIMITED, Kawasaki-shi, Kanagawa (JP)

(72) Inventors: Taku Saito, Kawasaki (JP); Taketo Endo, Kawasaki (JP); Kosuke Komaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/331,164

(22) Filed: Oct. 21, 2016

(65) Prior Publication Data
US 2017/0126315 A1    May 4, 2017

(30) Foreign Application Priority Data
Oct. 30, 2015 (JP) ................. 2015-214384

(51) Int. Cl.
*H04B 10/079* (2013.01)
*H04B 10/572* (2013.01)
*H04B 10/61* (2013.01)
*H04J 14/02* (2006.01)
*H04B 10/69* (2013.01)

(52) U.S. Cl.
CPC ..... *H04B 10/07955* (2013.01); *H04B 10/572* (2013.01); *H04B 10/616* (2013.01); *H04B 10/6931* (2013.01); *H04J 14/0221* (2013.01)

(58) Field of Classification Search
CPC ............ H04B 10/07955; H04B 10/572; H04B 110/616; H04B 10/6931

USPC .............................................. 398/38, 25, 9, 1
See application file for complete search history.

(56) References Cited

U.S. PATENT DOCUMENTS

| | | | |
|---|---|---|---|
| 2002/0196430 A1* | 12/2002 | May ..................... | G01B 11/255 356/124 |
| 2011/0229127 A1 | 9/2011 | Sakamoto et al. | |
| 2013/0236172 A1 | 9/2013 | Suzuki | |
| 2013/0287393 A1 | 10/2013 | Morie et al. | |
| 2013/0322876 A1* | 12/2013 | Gehrke ............ | H04B 10/07955 398/38 |
| 2016/0164624 A1 | 6/2016 | Yamauchi | |

(Continued)

FOREIGN PATENT DOCUMENTS

| | | |
|---|---|---|
| JP | 2011-199687 | 10/2011 |
| JP | 2013-162137 | 8/2013 |

(Continued)

*Primary Examiner* — Oommen Jacob
(74) *Attorney, Agent, or Firm* — Fujitsu Patent Center

(57) ABSTRACT

An optical transmission apparatus may include a coherent detector, a photoelectric converter, an amplifier, a gain controller, and an optical power monitor. The coherent detector may perform a coherent detection on received light including a plurality of wavelengths to select light having any one of the wavelengths. The photoelectric converter may convert the light having the selected wavelength to an electrical signal. The amplifier may amplify the electrical signal. The gain controller may control a gain of the amplifier depending on an output amplitude of the amplifier. The optical power monitor may calculate an optical power level of the selected wavelength based on the gain and the output amplitude.

6 Claims, 26 Drawing Sheets

(56) References Cited

U.S. PATENT DOCUMENTS

2017/0126315 A1* 5/2017 Saito .................. H04B 10/6931
2017/0134097 A1* 5/2017 Morie ................... H04B 10/61

FOREIGN PATENT DOCUMENTS

| JP | 2013-179557 | 9/2013 |
| JP | 2014-14008 | 1/2014 |
| JP | 2015-84594 | 4/2015 |
| JP | 5700050 | 4/2015 |
| WO | 2012/066859 | 5/2012 |
| WO | 2015/004828 | 1/2015 |

* cited by examiner

OPTICAL TRANSMISSION APPARATUS, OPTICAL POWER MONITOR, AND METHOD OF MONITORING OPTICAL POWER

CROSS-REFERENCE TO RELATED APPLICATION

This application is based upon and claims the benefit of priority of the prior Japanese Patent Application No. 2015-214384, filed on Oct. 30, 2015, the entire contents of which are incorporated herein by reference.

FIELD

The embodiment discussed herein is related to an optical transmission apparatus, an optical power monitor, and a method of monitoring an optical power.

BACKGROUND

As a communication traffic in a backbone optical network is increased, a transmission capacity of an optical communication system is expanding. As an example of a technology available to expand the transmission capacity, a WDM technology in which plural wavelengths are wavelength-division-multiplexed has been used in the optical communication system.

By using the WDM technology, a plurality of wavelengths (in other words, multi-channels) can be transmitted in a single optical transmission. Thus, it is possible to achieve large-capacity (in other words, high-speed) optical communication.

A coherent optical receiver is applicable as an optical receiver that receives light transmitted with the multi-channels. Even when light with the multi-channels is input to the coherent optical receiver, the coherent optical receiver is available to selectively receive a target channel light having a wavelength desired to be received by performing a coherent detection.

RELATED ART REFERENCE(S) LIST

Patent Document 1: JP 2011-199687 A
Patent Document 2: JP 2013-162137 A
Patent Document 3: JP 2013-179557 A
Patent Document 4: JP 2014-14008 A
Patent Document 5: WO 2012/066859 A
Patent Document 6: JP 2015-84594 A
Patent Document 7: WO 2015/004828 A
Patent Document 8: US 2011/229127 A
Patent Document 9: US 2013/236172 A
Patent Document 10: US 2013/287393 A In the coherent optical receiver that receives light transmitted with the multi-channels, a total optical power level of the multi-channels including a target channel can be monitored or detected by using a photo-detector or a photo-diode (PD).

Meanwhile, in order to monitor an optical power level of a target channel with a single wavelength in the coherent optical receiver, it is considered that the optical power level of the target channel is calculated based on an electrical signal after the coherent detection.

However, in the calculation based on the electrical signal after the coherent detection, an error is easily occurred due to characteristics of an electrical circuit applied in the coherent optical receiver. Therefore, a range available to calculate the optical power level of the target channel with satisfying a predetermined accuracy.

SUMMARY

According to an aspect, an optical transmission apparatus may include a coherent detector, a photoelectric converter, an amplifier, a gain controller, and an optical power monitor. The coherent detector may perform a coherent detection on received light including a plurality of wavelengths to select light having any one of the wavelengths. The photoelectric converter may convert the light having the selected wavelength to an electrical signal. The amplifier may amplify the electrical signal. The gain controller may control a gain of the amplifier depending on an output amplitude of the amplifier. The optical power monitor may calculate an optical power level of the selected wavelength based on the gain and the output amplitude.

Further, according to another aspect, an optical power monitor may include an acquisition unit and a calculator. The acquisition unit may acquire a gain and an amplitude in an optical receiver, which performs a coherent detection on received light including a plurality of wavelengths to select light having any one of the wavelengths, converts the light having the selected wavelength to an electrical signal, amplifies the electrical signal with an amplifier, and controls a gain of the amplifier depending on an amplitude of the amplified electrical signal. The calculator may calculate an optical power level of the selected wavelength based on the gain and the amplitude.

Furthermore, according to still another aspect, a method of monitoring an optical power may include: acquiring a gain and an amplitude in an optical receiver, which performs a coherent detection on received light including a plurality of wavelengths to select light having any one of the wavelengths, converts the light having the selected wavelength to an electrical signal, amplifies the electrical signal with an amplifier, and controls a gain of the amplifier depending on an amplitude of the amplified electrical signal; and calculating an optical power level of the selected wavelength based on the gain and the amplitude which are acquired by the acquiring.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
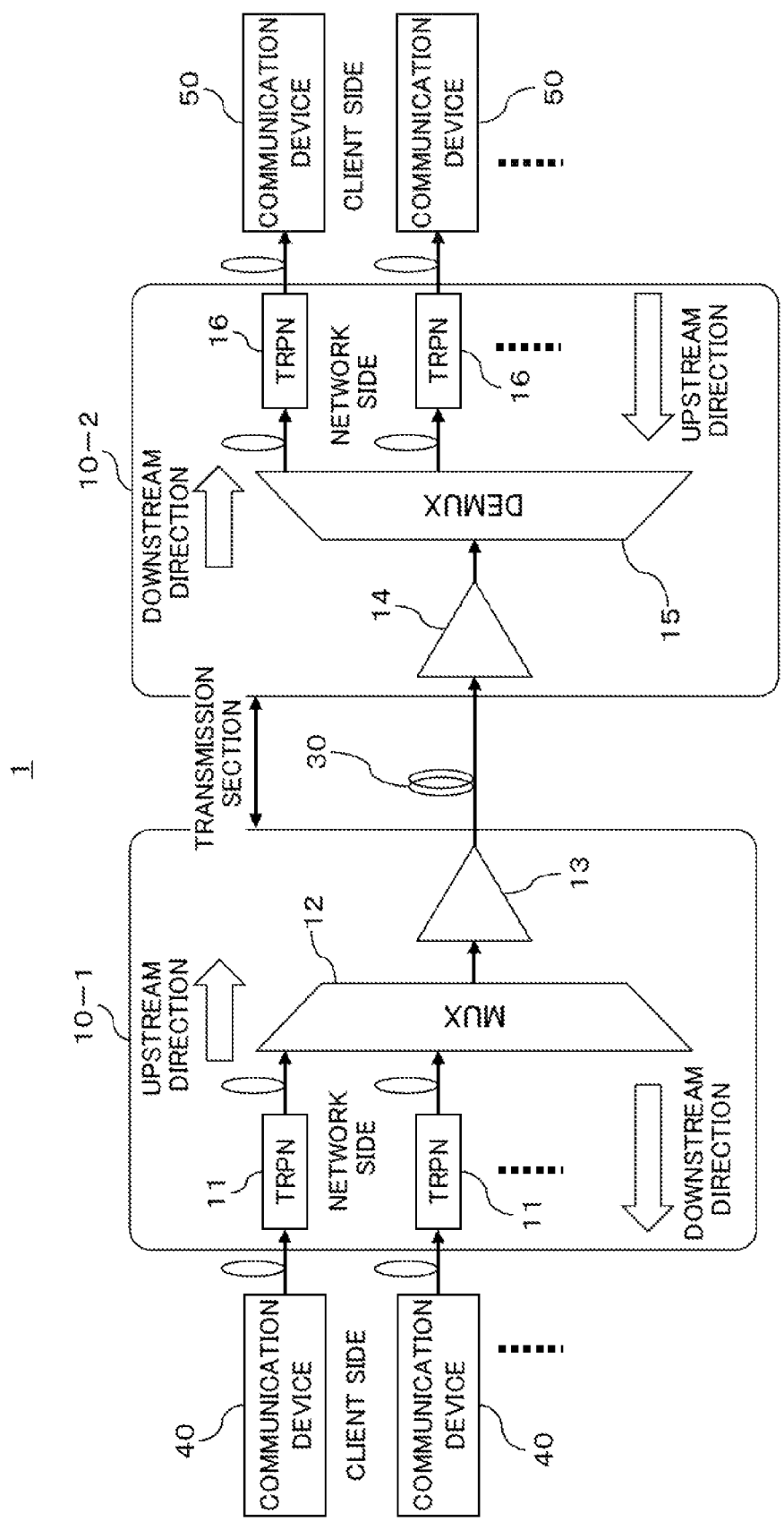
FIG. 1 is a block diagram illustrating a configuration example of a wavelength division multiplex (WDM) optical network as an example of an optical transmission system.

Hereinafter, an embodiment will be described with reference to the drawings. However, the embodiment described below is only illustrative and does not intend to exclude application of various modifications and technologies that are not explicitly described below. Further, various exemplary aspects described below may be optionally combined and carried out. In addition, components assigned the same reference numeral in the drawings used for the following embodiment will represent identical or same components unless otherwise specified.

FIG. 1 is a block diagram illustrating a configuration example of a wavelength division multiplex (WDM) optical network that is an example of an optical transmission system. For example, a WDM optical network 1 illustrated in FIG. 1 may include an optical transmission apparatus 10-1 and an optical transmission apparatus 10-2.

For example, the optical transmission apparatus 10-1 and the optical transmission apparatus 10-2 may be optical-communicably connected to each other with an optical transmission line 30. The optical transmission line 30 may be an optical fiber. The optical communication between the optical transmission apparatuses 10-1 and 10-2 may be unidirectional or bidirectional. For example, FIG. 1 illustrates a configuration example with focusing on an optical communication from the optical transmission apparatus 10-1 to the optical transmission apparatus 10-2.

When it is not needed to distinguish between the optical transmission apparatuses 10-1 and 10-2, the optical transmission apparatus 10-1 or 10-2 may be simply referred to as the "optical transmission apparatus 10". The optical transmission apparatus 10 is an example of an element (in other words, a network element: NE) of the WDM optical network 1. The NE 10 may correspond to an optical sender station, an optical receiver station, an optical relay station, or an optical add-drop station such as a reconfigurable optical add-drop multiplexer (ROADM). The "station" may be referred to as a "node".

For example, in FIG. 1, NE 10-1 may correspond to the optical sender station (or optical sender node), and NE 10-2 may correspond to the optical receiver station (or optical receiver node).

In the optical transmission line 30 between the NEs 10-1 and 10-2, one or more of optical amplifiers may be provided depending on a transmission distance of WDM light. A node including an optical amplifier may be considered as corresponding to an optical relay node. In some cases of the transmission distance of the WDM light, no optical amplifier may be needed.

As illustrated in FIG. 1, the optical transmission apparatus 10-1 may include a plurality of transponders (TRPN) 11, and a multiplexer (MUX) 12.

For example, each of the transponders 11 may be optically connected to a communication device 40 such as a router with an optical fiber. Each of the transponders 11 may be optically connected to the multiplexer 12 with an optical fiber.

The communication device 40 may be a communication device of a client (may be referred to as a "tributary"). For example, the communication device 40 of the client may correspond to a communication device, which is used in a synchronous digital hierarchy (SDH), in a synchronous optical network (SONET), or in an Ethernet (registered trademark). Such correspondence for the communication device 40 is also applicable to a communication device 50 connected to the optical transmission apparatus 10-2.

A signal transmitted from the communication device 40 is received by a corresponding transponder 11, and is converted to light having any one of wavelengths (may be referred to as "channel"). The converted light is input to the multiplexer 12.

The multiplexer 12 may be a wavelength-multiplexing coupler such as a WDM coupler, and wavelength-multiplexes signal light received from the transponder 11 to generate WDM light. The generated WDM light is transmitted to the optical transmission line 30. In the transmission, the WDM light may be amplified to have predetermined transmission optical power by an optical amplifier 13 provided on a post-stage of the multiplexer 12.

The optical amplifier 13 may be referred to as a "post-amplifier 13" or a "transmission amplifier 13". The optical amplifier 13 may be unnecessary to the optical transmission apparatus 10-1 depending on a transmission distance of the WDM light.

The WDM light transmitted to the optical transmission line 30 is received by the optical transmission apparatus 10-2, for example. As illustrated in FIG. 1, the optical transmission apparatus 10-2 may include a demultiplexer (DEMUR) 15 and a plurality of transponders (TRPN) 16.

An optical amplifier 14 which amplifies the received WDM light may be provided on a pre-stage of the demultiplexer 15. The optical amplifier 14 may be referred to as a "pre-amplifier 14" or a "reception amplifier 14). The optical amplifier 14 may be unnecessary to the optical transmission apparatus 10-2 depending on a transmission distance of the WDM light.

The demultiplexer 15 demultiplexes the received WDM light for each wavelength to input the demultiplexed light into any one of the transponders 16. In a case where a coherent reception is available in the transponder 16, the demultiplexer 15 may be an optical splitter which branches the WDM light instead of the demultiplexer 15. The optical splitter may be a branch coupler.

The transponder 16 photo-electrically converts light input from the demultiplexer 15 into an electrical signal to transmit the electrical signal to the communication device 50 of a client.

FIG. 1 illustrates a configuration with focusing on a unidirectional communication from the optical transmission apparatus 10-1 to the optical transmission apparatus 10-2. However, the same configuration as described above may be applied to a communication in an opposite direction. In other words, a bidirectional optical communication may be available between the optical transmission apparatuses 10-1 and 10-2. Accordingly, a bidirectional communication may also be available between the communication devices 40 and 50.

The bidirectional optical communication may be performed through a plurality of the optical transmission lines 30 which are respectively provided for both of the directions between the optical transmission apparatuses 10-1 and 10-2. For example, it can be understood that the communication in an opposite direction from the optical transmission apparatus 10-2 to the optical transmission apparatus 10-1 in FIG. 1 is achieved by a configuration in which the optical transmission apparatus 10-1 is read as the optical transmission apparatus 10-2, and the optical transmission apparatus 10-2 is read as the optical transmission apparatus 10-1.

For convenience, among the both directions, the direction in which the optical transmission apparatus 10-1 (or 10-2) transmits the WDM light to the optical transmission line 30 may be referred to as an "upstream direction", and the opposite direction thereof may be referred to as a "downstream direction".

Accordingly, the optical transmission apparatuses 10-1 and 10-2 may respectively include a transmission system corresponding to the upstream direction, and a reception system corresponding to the downstream direction. For example, in FIG. 1, the transponder 11 and the multiplexer 12 correspond to the transmission system of the optical transmission apparatus 10-1, and the demultiplexer 15 and the transponders 16 correspond to the reception system of the optical transmission apparatus 10-2.

In other words, although not illustrated in FIG. 1, the optical transmission apparatus 10-1 may include a demultiplexer 15 and transponders 16 as a reception system similar to the reception system of the optical transmission apparatus 10-2.

Further, although not illustrated in FIG. 1, the optical transmission apparatus 10-2 may include transponders 11 and a multiplexer 12 as a transmission system similar to the transmission system of the optical transmission apparatus 10-1.

Each of the transponders 11 (or 16) may be common to the transmission system and the reception system. In other words, each transponder 11 and each transponder 16 may have a common configuration of a transmitter and a receiver.

The receiver of the transponder 11 (or 16) may have a "single-channel reception" configuration or a "multi-channel reception" configuration. In the signal-channel reception, signal light of a channel desired to be received (may be referred to as a "target channel") among a plurality of channels of the received WDM light is selectively input to the receiver.

In contrast, in the multi-channel reception, signal light of a plurality of channels including the target channel in the received WDM light may be input to the receiver. Even when signal light with a plurality of channels is input to the receiver, the receiver is available to detect a signal component of the target channel by performing a coherent detection.

For example, as described later, in the coherent detection, local oscillation light of a wavelength desired to be received, and received light with a plurality of channels are mixed to detect a beat signal depending on an optical interference. The beat signal may be complex information indicative of an electric field of light corresponding to the wavelength desired to be received.

Figure 2:
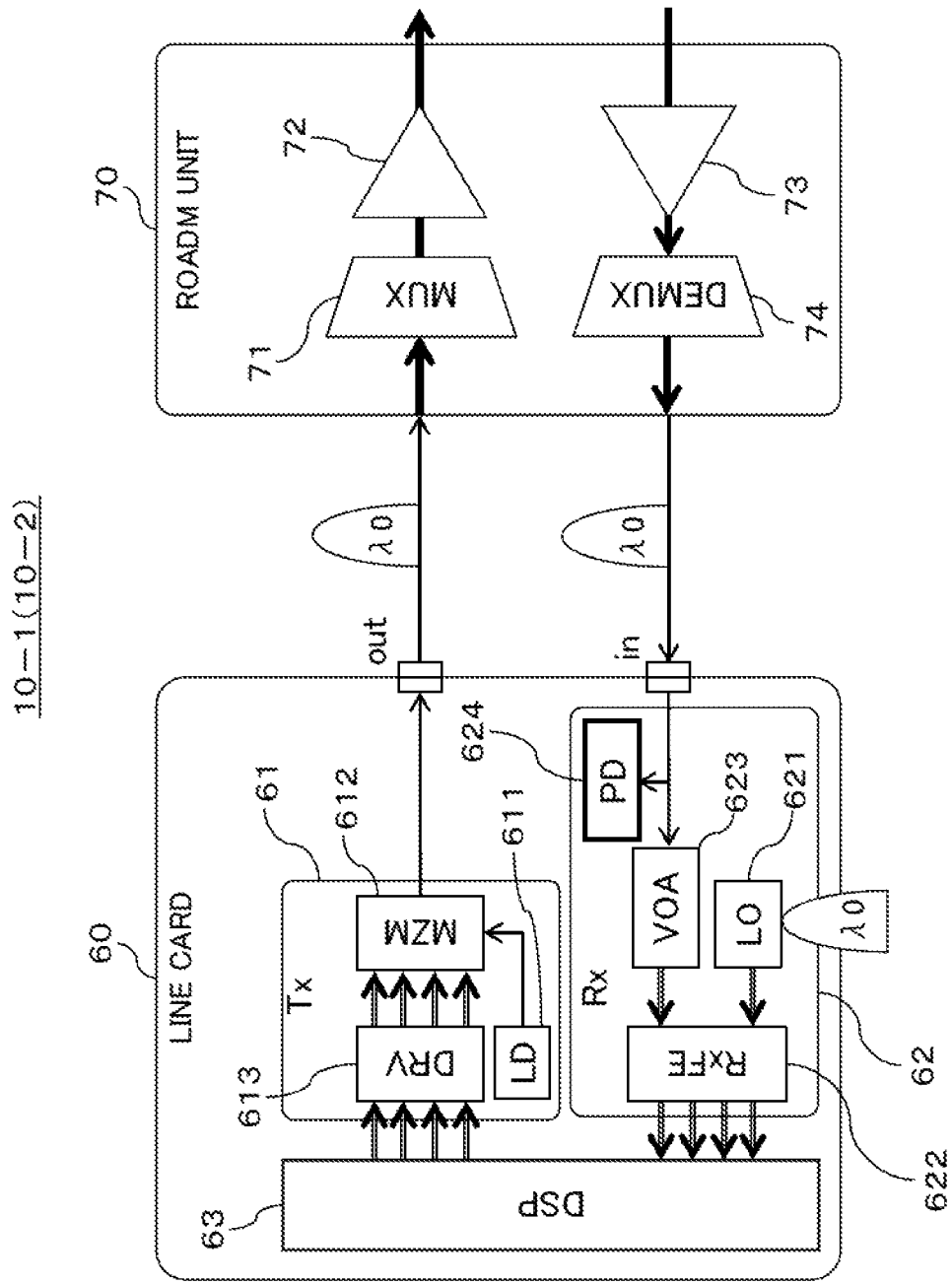
FIG. 2 is a block diagram illustrating a configuration example of an optical transmission apparatus with a single channel reception configuration.
Figure 3:
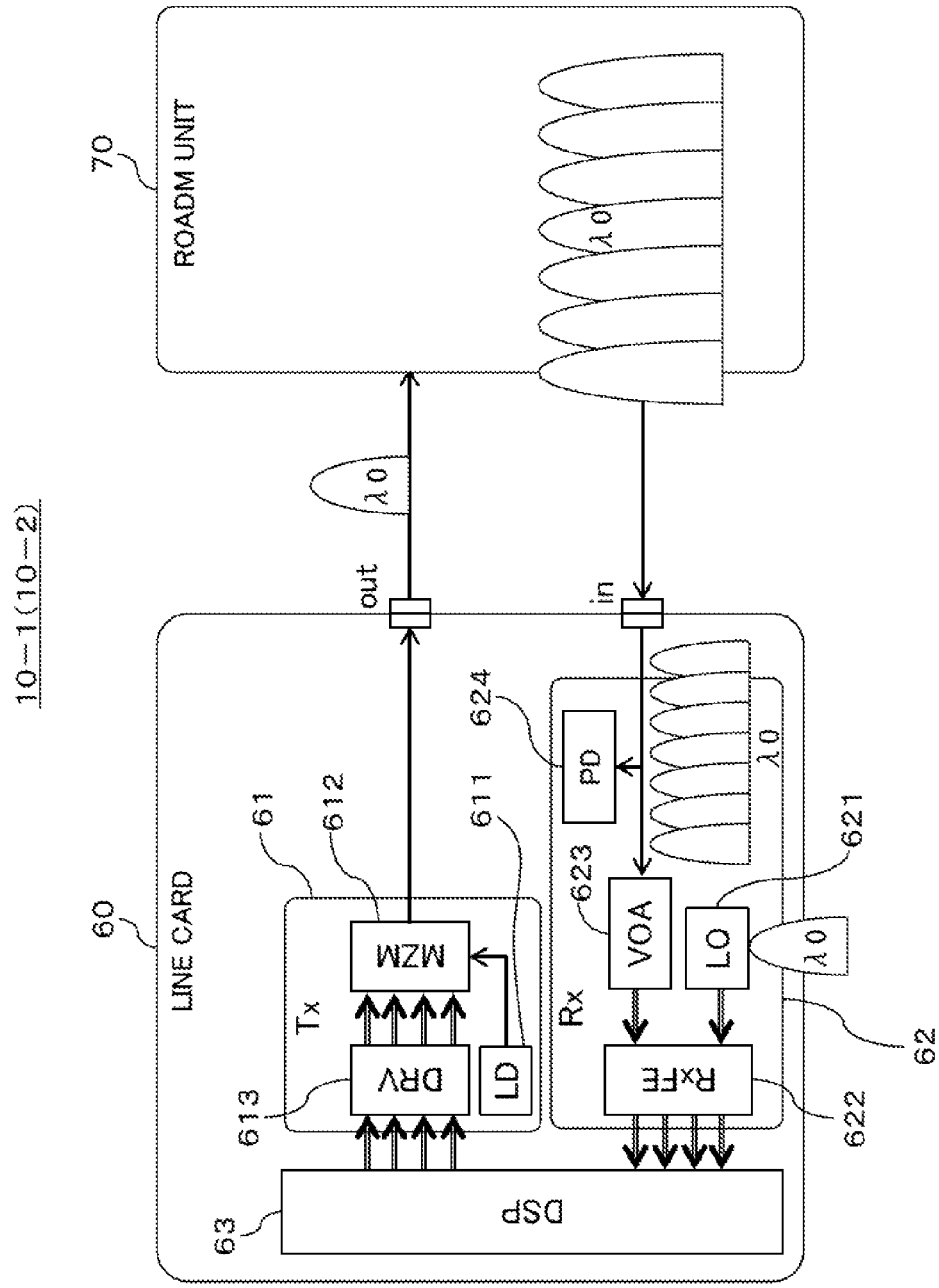
FIG. 3 is a block diagram illustrating a configuration example of an optical transmission apparatus with a multi-channel reception configuration.

FIG. 2 illustrates a configuration example of the optical transmission apparatus 10 having the single-channel reception configuration, and FIG. 3 illustrates a configuration example of the optical transmission apparatus 10 having the multi-channel reception configuration. For example, the optical transmission apparatus 10 illustrated in FIGS. 2 and 3 is a ROADM, and may include an optical transmission and reception block 60, and a ROADM unit 70.

The optical transmission and reception block 60 illustrated in FIGS. 2 and 3 may be achieved by a "line card 60". The line card 60 may be considered as corresponding to any one of the transponders 11 (or 16), or corresponding to one function (or element) of the transponder 11 (or 16).

For example, the optical transmission and reception block 60 may include an optical transmitter 61, an optical receiver 62, and a digital signal processor (DSP) 63.

For example, the optical transmitter 61 may include a light source 611, an optical modulator 612, and a driver 613. The optical modulator 612 is driven by a drive signal according to a transmission data signal generated by the DSP 63. Thereby, output light of the light source 611 is modulated by the transmission data signal to generate transmission modulated signal light.

A semiconductor laser diode (LD) may be applied to the light source 611. The LD may be an LD of which an emission wavelength is fixed, or a tunable LD of which an emission wavelength is variable. A Mach-Zehnder (MZ) optical modulator may be applied to the optical modulator 612. A multi-level phase shift keying (PSK), or a multi-level quadrature amplitude modulation (QAM) may be applied to an optical modulation format in the optical modulator.

As an optical modulation format, modulation formats such as a polarization multiplexing and an orthogonal frequency division multiplexing (OFDM) for a single wavelength may be appropriately combined. For example, a polarization multiplexing QPSK (dual polarization-QPSK) format, in which transmission data is mapped for different polarized components (for example, an X-polarized component and a Y-polarized component), may be applied to the optical modulator.

Meanwhile, the optical receiver 62 may include a local oscillation light source (LO) 621, and a reception front-end (RxFE) 622. The "LO" is an abbreviation of a local oscillator.

The RxFE 622 performs a coherent detection on received light input from the ROADM unit 70 by using output light (may be referred to as "local oscillation light") of the local oscillation light source 621. The RxFE 622 is an example of an optical receiver that receives light.

The light input from the ROADM unit 70 to the optical receiver 62 is single-channel light in an example in FIG. 2, and is multi-channel light in an example in FIG. 3.

For example, the ROADM unit 70 illustrated in FIG. 2 demultiplexes the received WDM light for each channel, and selectively outputs the demultiplexed light corresponding to any one of channels to the line card 60.

A demultiplexer 74 may be used to demultiplex the channels. An array waveguide grating (AWG) or a tunable optical filter may be applied to the demultiplexer 74. The demultiplexer 74 may be considered as corresponding to the demultiplexer 15 illustrated in FIG. 1.

In the ROADM unit 70 illustrated in FIG. 2, a pre-amplifier 73 may be provided on a pre-stage of the demultiplexer 74. The pre-amplifier 73 may be considered as corresponding to the optical amplifier 14 illustrated in FIG. 1.

A multiplexer 71 may be provided to the ROADM unit 70 in FIG. 2. A post-amplifier 72 may be provided on a post-stage of the multiplexer 71. The multiplexer 71 and the post-amplifier 72 may be considered as respectively corresponding to the multiplexer 12 and the optical amplifier 13 which are illustrated in FIG. 1.

Meanwhile, the ROADM unit 70 illustrated in FIG. 3 is colorless and outputs any of plural channels of signal light included in the received WDM light to the optical receiver 62.

The optical receiver 62 is available to detect, even when signal light with plural channels is input, a signal component of a target channel by performing a coherent detection in the RxFE 622.

For example, even when signal light with plural channels adjacent to each other is input to the RxFE 622 of the optical receiver 62, the RxFE 622 is available to cut out (or separate) a signal component in a limited frequency range centering around a frequency of the local oscillation light.

Accordingly, the DSP 63 is possible to perform signal processing on a target channel without being affected by the adjacent channel. Since signal light with multi-channels is allowed to be input to the optical receiver 62, it is unnecessary for the ROADM unit 70 to equip an expensive channel-demultiplexing function which uses the AWG, or the tunable optical filter, for example.

Further, in a recent optical communication technology, in order to improve a spectral efficiency in a WDM transmission band, a channel interval of the WDM light on a light transmission side may be set to be as narrow as possible for densification by using a nyquist filter. The WDM light in which channels are densified may be referred to as a "super channel" signal.

In the single-channel reception, it is difficult to realize filter characteristics available to definitely cut out a signal component of a target channel from the supper channel signal. In contrast, in the multi-channel reception, by using the coherent detection as described above, it is available to definitely cut out the signal component of the target channel from the supper channel signal to perform signal processing on the target channel.

The RxFE 622 has an appropriate range of an input optical power level (may be referred to as "reception range") depending on reception characteristics of the RxFE 622. It can be considered that the reception characteristics of the RxFE 622 are determined depending on characteristics of a photoelectric converter such as the photo-detector or photo-diode (PD) and/or a trans-impedance amplifier (TIA) that are/is provided in the RxFE 622, for example. An example of the characteristics of the PD is a photoelectric conversion efficiency, and an example of the characteristics of the TIA is a current-voltage conversion efficiency.

In order to limit the input optical power level of the RxFE 622 in an appropriate reception range, as illustrated in FIGS. 2 and 3, a variable optical attenuator (VOA) 623 may be provided on a pre-stage of the RxFE 622.

The VOA 623 adjusts a power level of signal light input to the RxFE 622 of the optical receiver 62 from the ROADM unit 70 by being controlled an attenuation (or loss) amount (may be referred to as a "VOA loss") thereof.

For example, the VOA loss may be controlled based on a result of monitoring (may be referred to as "detecting" or "measuring") the output optical power level from the ROADM unit 70 by using a PD 624. For example, the VOA loss may be controlled so that the optical power level monitored by the PD 624 becomes an appropriate power level that enters the reception range of the RxFE 622. The PD 624 may be referred to as a "monitor PD 624" or a "monitor 624".

The control of the VOA loss based on the monitoring result by using the PD 624 provided on the pre-stage of the VOA 623 may be effective in the single-channel reception illustrated in FIG. 2. However, in the multi-channel reception illustrated in FIG. 3, an error is easily to increase.

For example, the optical power level detected by the PD 624 is an optical power level of the target channel in the single-channel reception, but is a total optical power level of multi-channels including the target channel in the multi-channel reception.

For convenience, the optical power level of the target channel may be referred to as a "target channel power", and the total optical power level of the multi-channels may be referred to as a "total power".

In the configurations illustrated in FIGS. 2 and 3, the PD 624 is provided inside the optical receiver 62, but the PD 624 may be provided outside the optical receiver 62. Further, in the configurations illustrated in FIGS. 2 and 3, the PD 624 is provided on the pre-stage of the VOA 623, but the PD 624 may be provided on the post-stage of the VOA 623. In other words, the PD 624 may be provided on an optical path in which received light propagates toward the RxFE 622.

Configuration Example of RxFE

Figure 4:
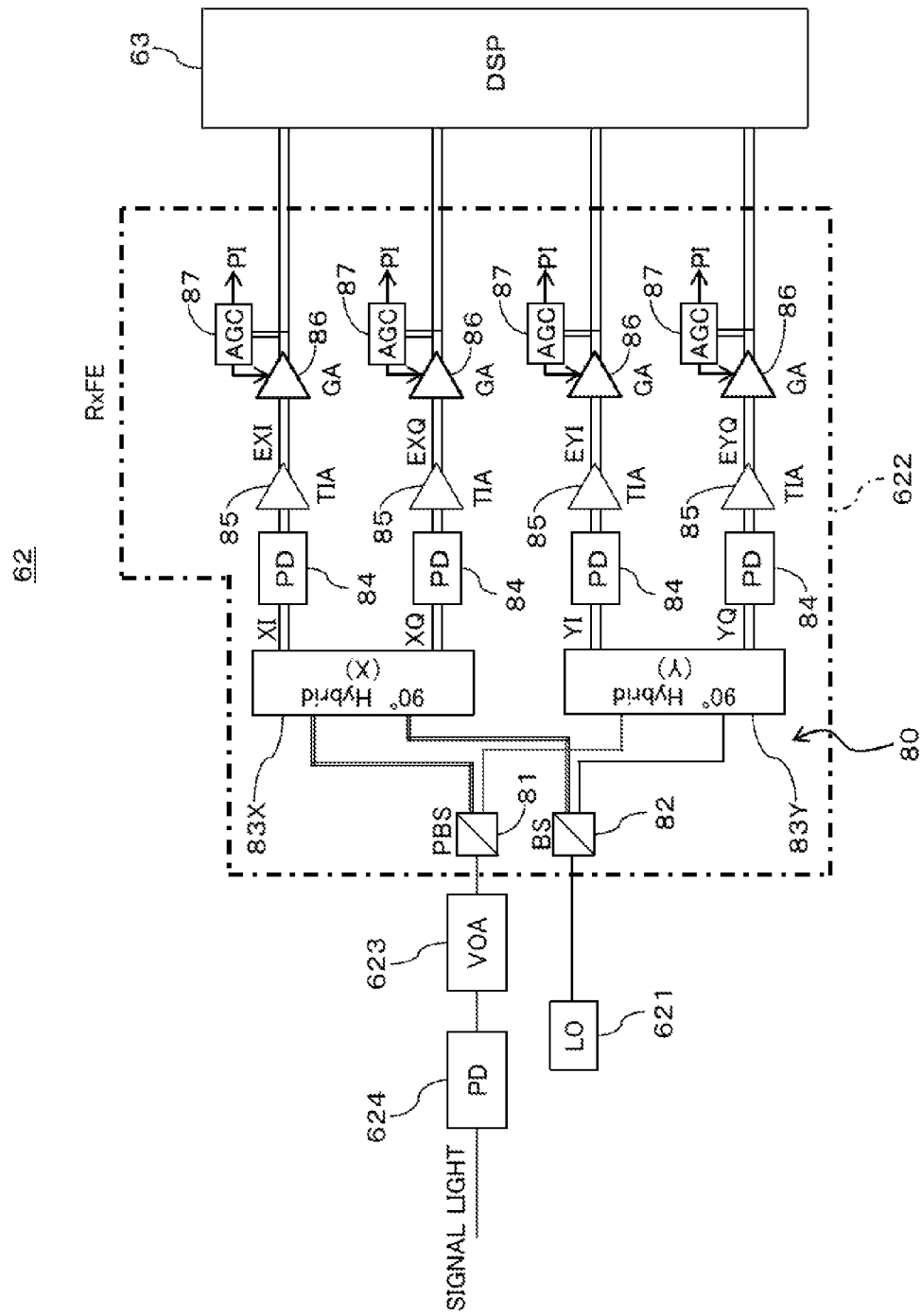
FIG. 4 is a block diagram illustrating a configuration example of an optical receiver.

FIG. 4 illustrates a configuration example of the optical receiver 62 with focusing on the RxFE 622 illustrated in FIG. 4. For example, polarization-multiplexed multi-channel signal light may be input to the RxFE 622.

Therefore, the RxFE 622 may include a polarization beam splitter (PBS) 81, a beam splitter (BS) 82, a 90° hybrid mixers 83X and 83Y, a PD 84, a TIA 85, a gain adjuster (GA) 86, and an automatic gain controller (AGC) 87. A variable gain amplifier of which a gain is variable may be applied to the GA 86, for example. Four sets of the PD 84, the TIA 85, the GA 86, and the AGC 87 may be provided in correspondence with four lanes described later.

In FIG. 4, since one or both of the VOA 623 and the PD 624 may be provided on an optical path in which received light propagates as described above, one or both of the VOA 623 and the PD 624 may be provided inside or outside the RxFE 622.

The PBS 81, the BS 82, and the 90° hybrid mixers 83X and 83Y constitute an example of a coherent detector 80 that performs the coherent detection by mixing local oscillation light of the LO 621 with received light including a plurality of wavelengths to select light of any one of the wavelengths.

For example, the PBS 81 separates received light input from the VOA 623 for each of different polarized components. The different polarized components may be orthogonal to each other, for example, and one of the polarized components may be referred to as an X-polarized component, and the other may be referred to as a Y-polarized component. The X-polarized component may be input to the 90° hybrid mixer 83X, and the Y-polarized component may be input to the 90° hybrid mixer 83Y.

The BS 82 branches the local oscillation light of the LO 621 to input the resultant branched light to both of the 90° hybrid mixers 83X and 83Y.

The 90° hybrid mixer 83X mixes the X-polarized component input from the PBS 81 with the local oscillation light input from the BS 82 at in-phases and different (e.g., quadrature) phases to cause an optical interference.

Thereby, for the X-polarized component, two sequences of signal light (or complex information indicative of an electric field of the light), one of which includes an in-phase (I-phase) component (XI) and the other of which includes a quadrature (Q-phase) component (XQ), are output from the 90° hybrid mixer 83X.

Similarly, the 90° hybrid mixer 83Y mixes the Y-polarized component input from the PBS 81 with the local oscillation light input from the BS 82 at in-phases and different (e.g., quadrature) phases to cause an optical interference.

Thereby, for the Y-polarized component, two sequences of signal light (or complex information indicative of an electric field of the light), one of which includes an in-phase (I-phase) component (YI) and the other of which includes a quadrature (Q-phase) component (YQ), are output from the 90° hybrid mixer 83Y.

In other words, for the two different polarized components (X and Y), the 90° hybrid mixers 83X and 83Y output signal light (XI, XQ, YI, and YQ) of two different I component and Q component. Therefore, four paths through which four sequences of the complex information propagates may be referred to as "lanes". Signals corresponding to four lanes are input to the PD 84.

The four sequences of the signal light (XI, XQ, YI, and YQ), which are obtained in the 90° hybrid mixers 83X and 83Y and correspond to the four lanes, may be converted into current signals according to received light power in the PD 84 corresponding to the respective lane. Accordingly, the "PD 84" may be referred to as a "photoelectric converter 84".

The PD 84 may be configured as a "balanced PD". The "balanced PD" includes two PDs respectively receiving positive-phase light and reversed-phase light which are output from the 90° hybrid mixers 83X and 83Y, and differentially outputs of current signals of the respective PDs. In other words, the "balanced PD" performs a differential detection on signal light to demodulate phase information of the signal light. The differential detection is possible to improve reception characteristics of the signal light. The "balanced PD" may be referred to as a "balanced receiver".

Each of the four TIAs 85 converts a current signal, which is obtained in the PD 84 corresponding to one of the four lanes, into a voltage signal (EXI, EXQ, EYI, or EYQ). The current signals obtained by the PDs 84 and the voltage signals obtained by the TIAs 85 may be collectively referred to as "electrical signals" (EXI, EXQ, EYI, and EYQ) for descriptive purposes.

Each of the four GAs 86 may be an electrical amplifier of which a gain is variable, and amplifies the voltage signal (EXI, EXQ, EYI, or EYQ) obtained in the TIA 85 corresponding to one of the four lanes. Each of the gain of the GAs 86 may be automatically controlled by the AGC 87 corresponding thereto.

For example, the gains of the respective GAs 86 may be controlled so that amplitude peak values (e.g., absolute values) of the voltage signals corresponding to the four lanes become the same and constant (that is, |EXI|=|EXQ|=|EYI|=|EYQ|.

For example, each of the AGCs 87 may monitor an output amplitude of the corresponding GA 86, and may control the gain of the GA 86 so that a monitored output amplitude becomes a predetermined amplitude value. Information of the amplitude monitored by the AGC 87 may be referred to as a "peak indicator (PI)". Accordingly, the AGC of the GA 86 may be referred to as a "constant control of the PI to a predetermined value". The PI may be used for an indicator which indicates whether or not the AGC of the GA 86 by the AGC 87 appropriately operates.

The voltage signals EXI, EXQ, EYI, and EYQ amplified by the respective GAs 86 may be input to the DSP 63. The DSP 63 performs digital signal processing on the input voltage signals EXI, EXQ, EYI, and EYQ.

An amplifier to adjust an output level may be provided between the GA 86 and DSP 63. By adjusting the gain of the amplifier, a final output amplitude input to the DSP 63 can be adjusted.

With the digital signal processing, it is possible to correct a chromatic dispersion (CD), a polarization mode dispersion (PMD), a polarization-dependent loss (PDL), and/or a non-linear effect, each of which may cause a deterioration in reception characteristics of signal light transmitted through the optical transmission line 30 (refer to FIG. 1) in a numerical calculation.

The "reception characteristics" may be referred to as "transmission characteristics" or a "signal quality". One or more of examples of an indicator indicative of the "signal quality" may be an optical signal to noise ratio (OSNR) and/or a bit error rate (BER).

The digital signal processing may include processing such as an analog-digital conversion (ADC), a dispersion correction, a sampling phase synchronization, an adaptive equalization, a frequency offset correction, a carrier phase recovery, and an error correction decoding.

The digital signal processing may be realized by an arithmetic device having arithmetic capability instead of the DSP 63. The arithmetic device may be referred to as a "processor device" or "processor circuit". The arithmetic device may be realized by using a field programmable gate array (FPGA), and/or a large scale integrated circuit (LSI).

Figure 6:
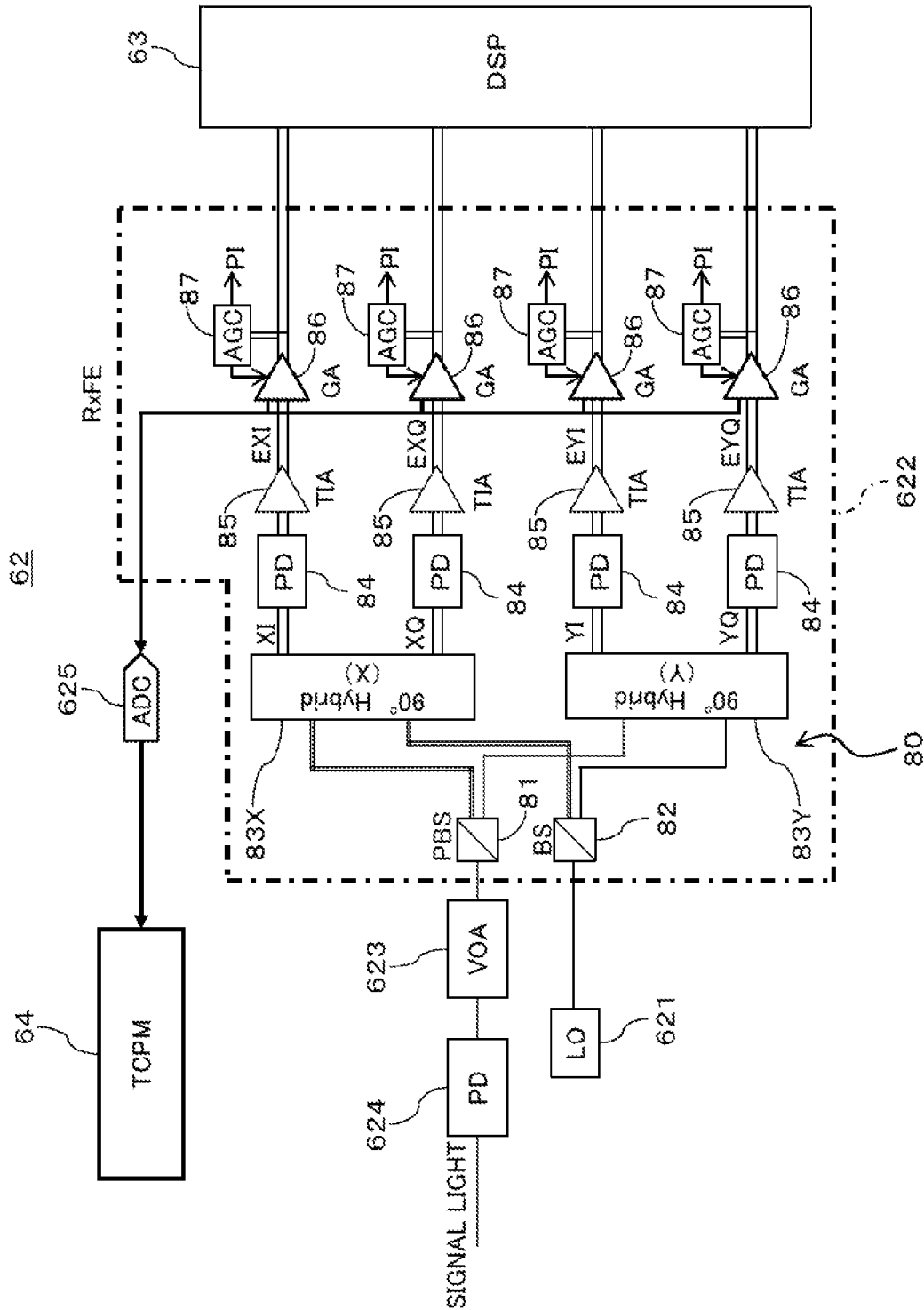
FIG. 6 is a block diagram illustrating still another configuration example of the optical receiver.

An ADC 625 converts a voltage (may be referred to as a "GA voltage" for descriptive purposes) of each GA 86, which is automatic-gain-controlled by the AGC 87, into a digital signal. In FIG. 6, the single ADC 625 is common to the GAs 86 of the four lanes, but four ADCs 625 may be provided to the four lanes, respectively.

Here, as the GA voltage increases, a gain value of the GA 86 also increases. Accordingly, the GA voltage may be dealt as information that is equivalent to the gain value of the GA 86.

The GA voltage of the digital signal obtained by the ADC 625, in other words, the gain value (may be referred to as a "monitored gain value") of the GA 86 may be applied to the VOA controller 65.

The GA 86 is controlled by the AGC 87 so that the PI becomes constant. Accordingly, as the amplitude of the voltage signal input to the GA 86 becomes large, a gain value of the GA 86 tends to decrease.

Hereinafter, a monitoring of a target channel power in a multi-channel transmission system will be considered. As illustrated in FIG. 2, in the signal-channel reception, signal light with a single channel that is a reception target channel is input to the line card 60.

Figure 5:
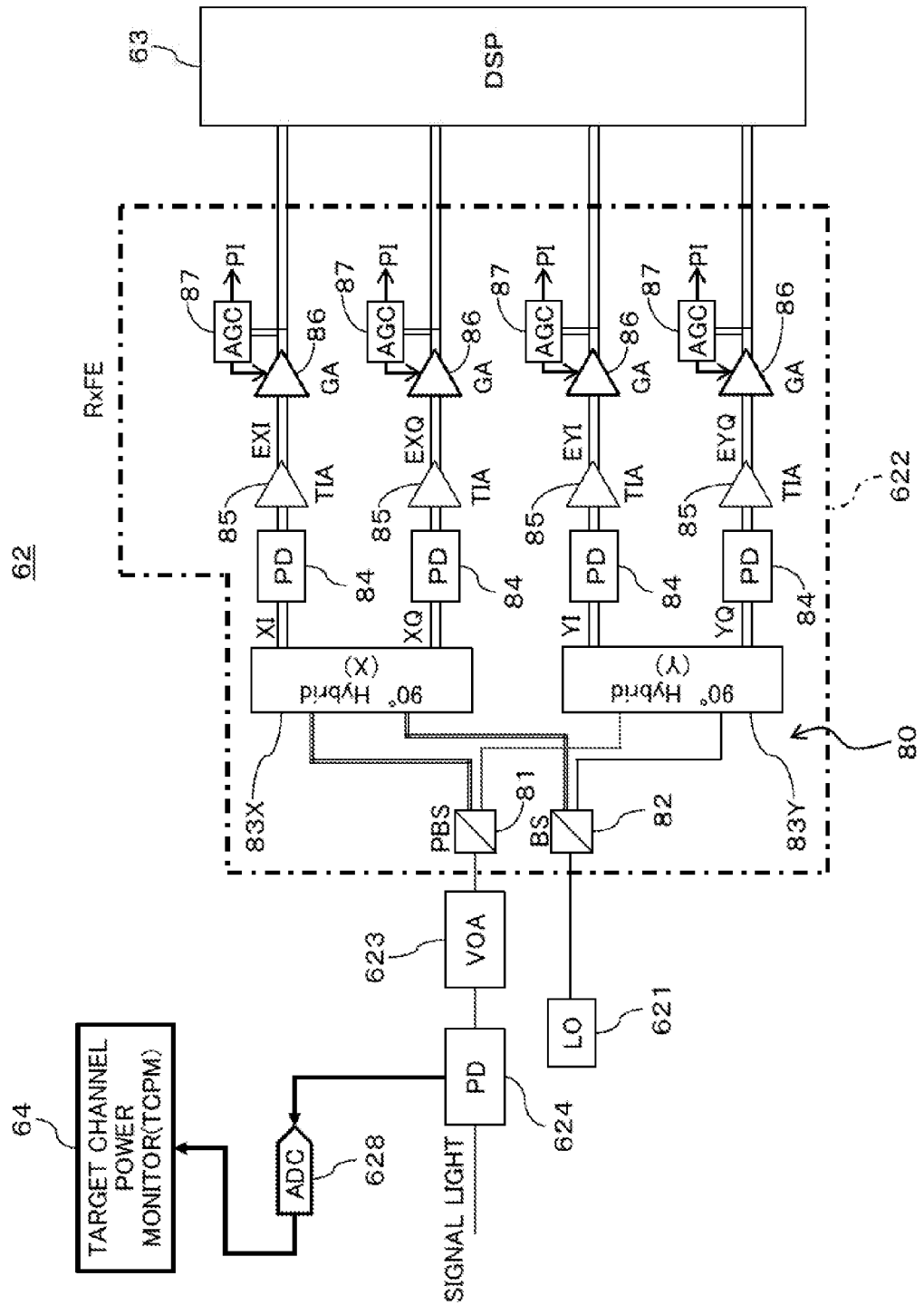
FIG. 5 is a block diagram illustrating another configuration example of the optical receiver.

Accordingly, for example, as illustrated in FIG. 5, it is possible to easily monitor the target channel power by monitoring received light power of the PD 624 provided at an input side of the line card 60 with the target channel power monitor (TCPM) 64.

In FIG. 5, a reference numeral 628 represents an analog-digital converter (ADC). The ADC 628 converts an analog output signal depending on a received light power of the PD 624 into a digital signal to output the digital signal to the TCPM 64.

Meanwhile, in the case of the multi-channel reception, with a configuration example illustrated in FIG. 5, it is possible to merely monitor a total power of signal light with multi-channels input to the line card 60 by the TCPM 64. Accordingly, it is unavailable to monitor a target channel power of a single channel with the TCPM 64.

In the multi-channel reception, as illustrated in FIG. 6, in order to selectively monitor a power of a target channel without adding and using an expensive component, it can be considered that the gain of the GA 86 in the RxFE 622 is monitored with the TCPM 64.

In FIG. 6, the ADC 625 converts each GA voltage, which is automatic-gain-controlled by the AGC 87, into a digital signal to input the digital signal to the TCPM 64. In FIG. 6, the single ADC 625 is common to the GAs 86 corresponding to the four lanes, but four ADCs 625 may be provided for the four lanes, respectively.

A gain value of each GA 86 corresponding to each lane, which is used in the TCPM 64, may be averaged. By averaging the gain value, it is possible to reduce an impact due to a possible deviation in the X-polarized and Y-polarized components.

The averaging of the gain value may be applied to all of the four lanes and may be applied to a part of the four lanes. For example, among the four lanes, two lanes of the in-plane components (XI and YI) or two lanes of the quadrature components (XQ and YQ) may be selected for averaging. Further, in a case where a polarization-dependent loss (PDL) of received signal light may be ignored, the TCPM 64 may selectively use one gain value of any one of the four lanes to perform processing described later, for example.

Here, an input amplitude of the GA 86 and the gain of the GA 86 have a correlation. For example, as the input amplitude to the GA 86 becomes smaller (in other words, the target channel power becomes lower), the gain of the GA 86 tends to increase. Meanwhile, as the input amplitude becomes larger (in other words, the target channel power becomes higher), the gain of the GA 86 tends to decrease.

By using such correlation, the TCPM 64 is available to calculate the target channel power based on the gain value of the GA 86. The gain value of the GA 86 may be referred to as a "GA" for descriptive purposes.

Figure 7:
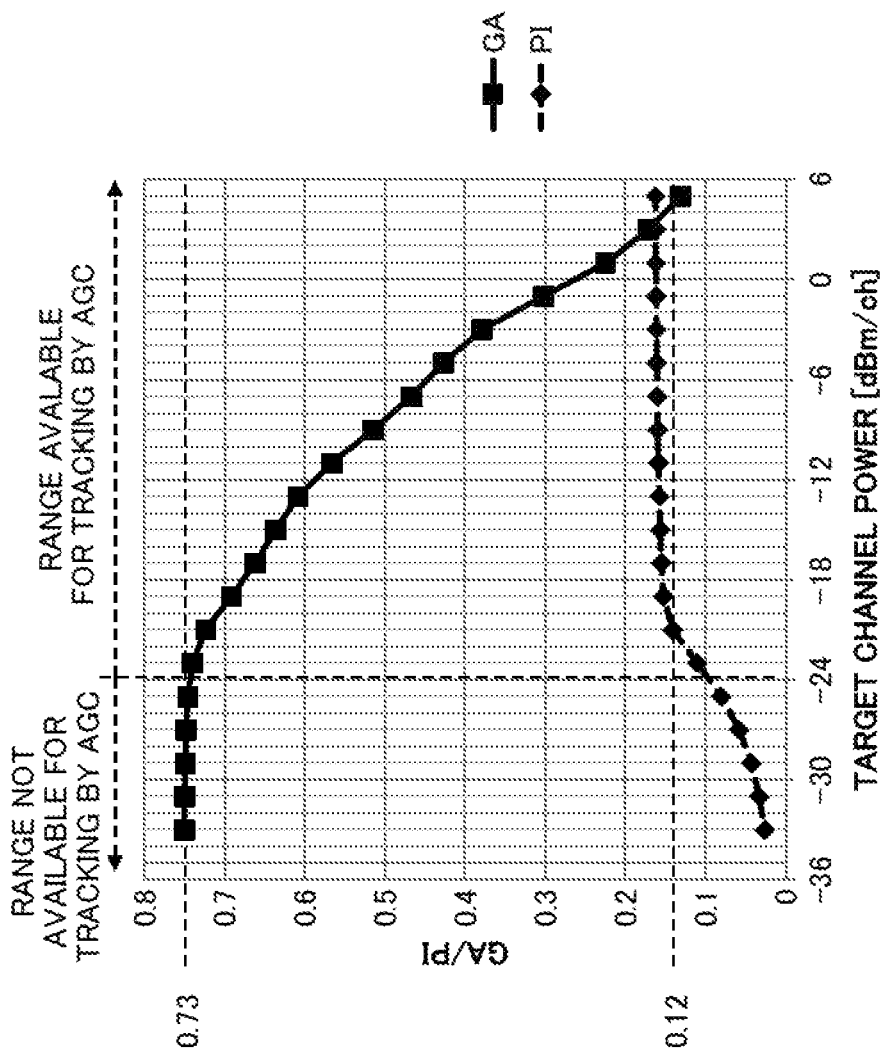
FIG. 7 is a diagram illustrating an example of a relationship between input optical power of target channel in an optical receiver and both of a gain (GA) of a gain controller and a peak indicator (PI) in a multi-channel reception.

FIG. 7 illustrates an example of a relationship between the input optical power of the RxFE 622 and both of the GA and the PI in the multi-channel reception. In the case of the multi-channel reception, the input optical power of the RxFE 622 corresponds to the target channel power of a single channel.

The horizontal axis of FIG. 7 represents the target channel power [dBm/ch], and the vertical axis of FIG. 7 represents the GA and the PI. Each of the GA and the PI may be represented by a voltage value. However, in the example illustrated in FIG. 7, the GA and the PI are normalized with a maximum voltage value, and take a value in a range of 0 to 1. This is also applied to FIGS. 8, 13, 14, 19, and 25.

The gain of the GA 86 controlled by the AGC 87 has the upper limit and the lower limit. In the example illustrated in FIG. 7, when the target channel power is lower than approximately "−24 dBm", the GA converges to the upper limit. Therefore, even when the AGC 87 operates normally, it is unavailable to control an output peak amplitude of the GA 86 to a constant value.

In other words, the AGC 87 is unavailable to track a variation in the target channel power. As a result, with focusing on the boundary in the vicinity of "−24 dBm", as the target channel power decreases, the PI tends to also decrease.

Meanwhile, although not illustrated in FIG. 7, when the GA converges to the lower limit, even when the AGC 87 operates normally, it is unavailable to control the output peak amplitude of the GA 86 to a constant value. Therefore, as the target channel power increases, the PI tends to also increase.

A function or a conversion table may be used in order to obtain the target channel power from the GA by using the correlation between the target channel power and the GA.

Figure 8:
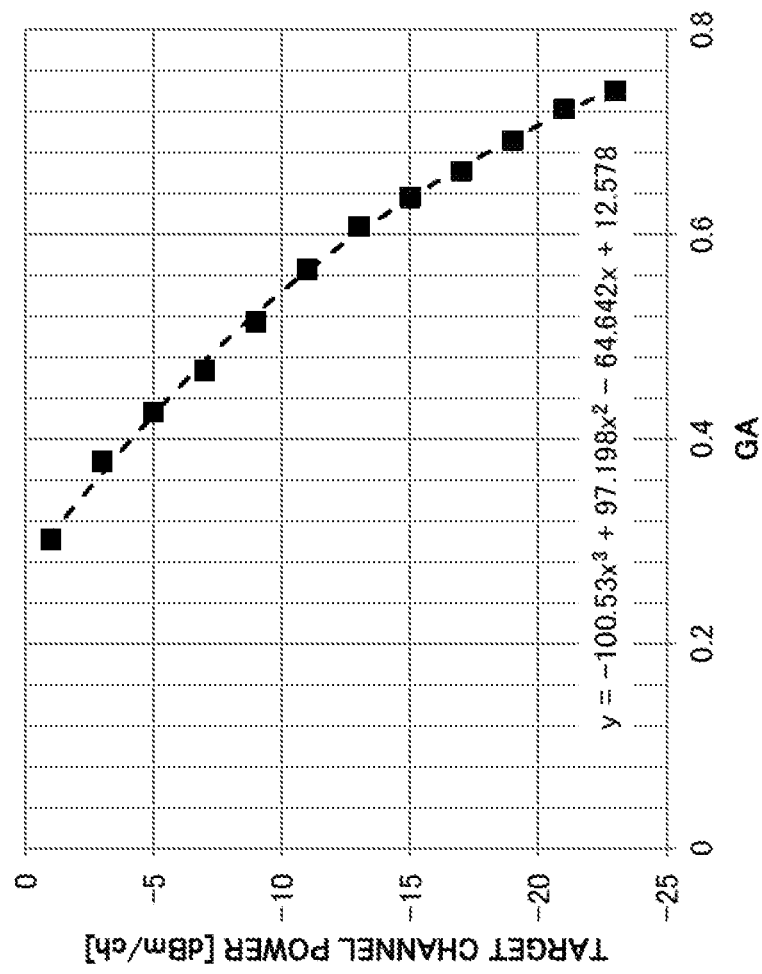
FIG. 8 is a diagram illustrating a fitting example with an approximation formula of target channel power with respect to the GA.

As a non-limiting example, descriptions will be made for an example of a method of obtaining the target channel power from the GA by using a function. As illustrated in FIG. 8, by fitting a range in which the GA monotonically increases (for example, GA=0.3 to 0.7), with an approximation formula (for example, a cubic function), a function of "$y=-100.53x^3+97.198x^2-64.642x+12.578$" is obtained. Coefficients of the function may be stored in a memory 645 as an example of conversion coefficients.

A monitored value (y) of the target channel power is obtained by assigning a value of the GA to "x". Accordingly, it is possible to obtain the monitored value of the target channel power from the GA by the function. In a case of using a table, a plurality of sets of values of x and y in the function may be registered in the table, for example. The table may be stored in the memory 645, for example.

Figure 9:
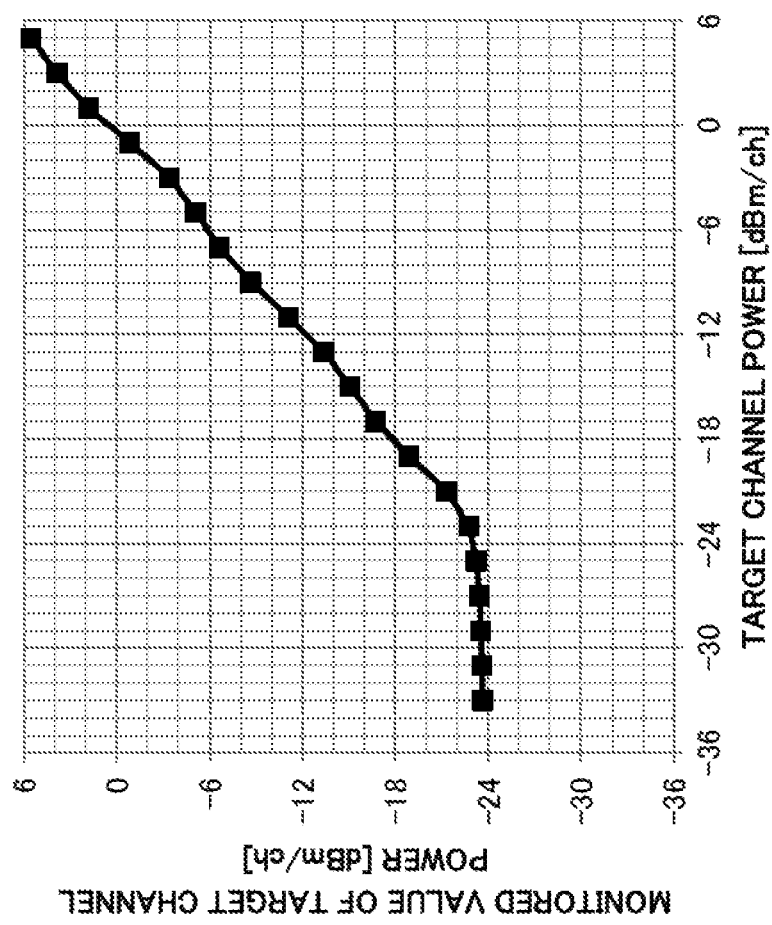
FIG. 9 is a diagram illustrating an example of a change in a monitored value of the target channel power with respect to the input optical power of the optical receiver.

FIG. 9 illustrates an example of a monitored value of the TCPM 64 by using the GA. The horizontal axis of FIG. 9 represents a target channel power corresponding to an input optical power to the RxFE 622, and the vertical axis of FIG. 9 represents a monitored value of the target channel power obtained from the GA.

As illustrated in FIG. 9, in a range in which the target channel power (horizontal axis) input to the RxFE 622 is greater than approximately −24 dBm, since the GA monotonically varies, it is possible to calculate the monitored value of the target channel power with sufficient accuracy.

However, when the target channel power input to the RxFE 622 is lower than approximately −24 dBm, the GA converges to the upper limit and varies little. Therefore, an error occurs in the monitored value of the target channel power, which is calculated from the GA.

With respect to the input optical power to the RxFE 622, there is an appropriate input range in view of reception characteristics of the RxFE 622 such as the photoelectric conversion efficiency of the PD 84 and the conversion efficiency of the TIA 85.

When the input optical power deviates from a predetermined range, a deterioration in the reception characteristics may be occurred. Therefore, it is preferable to notify the above case to a user by asserting a warning alarm or an alert. The warning alarm and the alert may collectively be referred to as an "alarm" for descriptive purposes. An assertion of the alarm may be limited to a case where the input optical power of the target channel deviates from the predetermined range without depending on input optical power of an adjacent channel.

The aforementioned TCPM 64 can be used to monitor the input optical power of the target channel. In order to suppress that an alarm is erroneously asserted even when the target channel power falls in the predetermined range and that no alarm is asserted even when the target channel power deviates from the defined range, the TCPM 64 is expected to have a sufficient monitor accuracy in a range as wide as possible.

For example, it is preferable that the TCPM 64 is available to monitor the target channel power with a sufficient accuracy from a high power at which the GA is less than the lower limit to a low power at which the GA is greater than the upper limit.

However, as illustrated in FIG. 9, according to the TCPM 64 using the GA, even when an actual input optical power is very low such as −30 dBm, since the GA converges to the upper limit and varies little, a monitored value indicates −24 dBm which is higher than an actual monitored value. As a result, an error of 6 dBm occurs.

Here, assuming that a threshold value for determination of an alarm assertion is set to −25 dBm, for example, even when the actual input optical power is very low such as −30 dBm, an alarm is not asserted. When the input optical power is high power at which the GA converges to the lower limit, a monitored value may indicate a value lower than an actual monitored value. Therefore, an alarm may be un-asserted.

As described above, the TCPM 64 using the GA may be unavailable to obtain a sufficient monitor accuracy, and thus, it may be unavailable to assert an alarm appropriately.

Here, with referring to the relationship between the input optical power of the RxFE 622 and both of the GA and the PI illustrated in FIG. 7, it can be seen that the PI is varied in an input optical power range (for example, less than −24 dBm) in which the GA substantially does not vary.

Therefore, in this embodiment, by using the PI in addition to the GA, the target channel power is obtained (or calculated). Hereinafter, descriptions will be made for some embodiments to obtain the target channel power by using both of the GA and the PI.

First Embodiment

Figure 10:
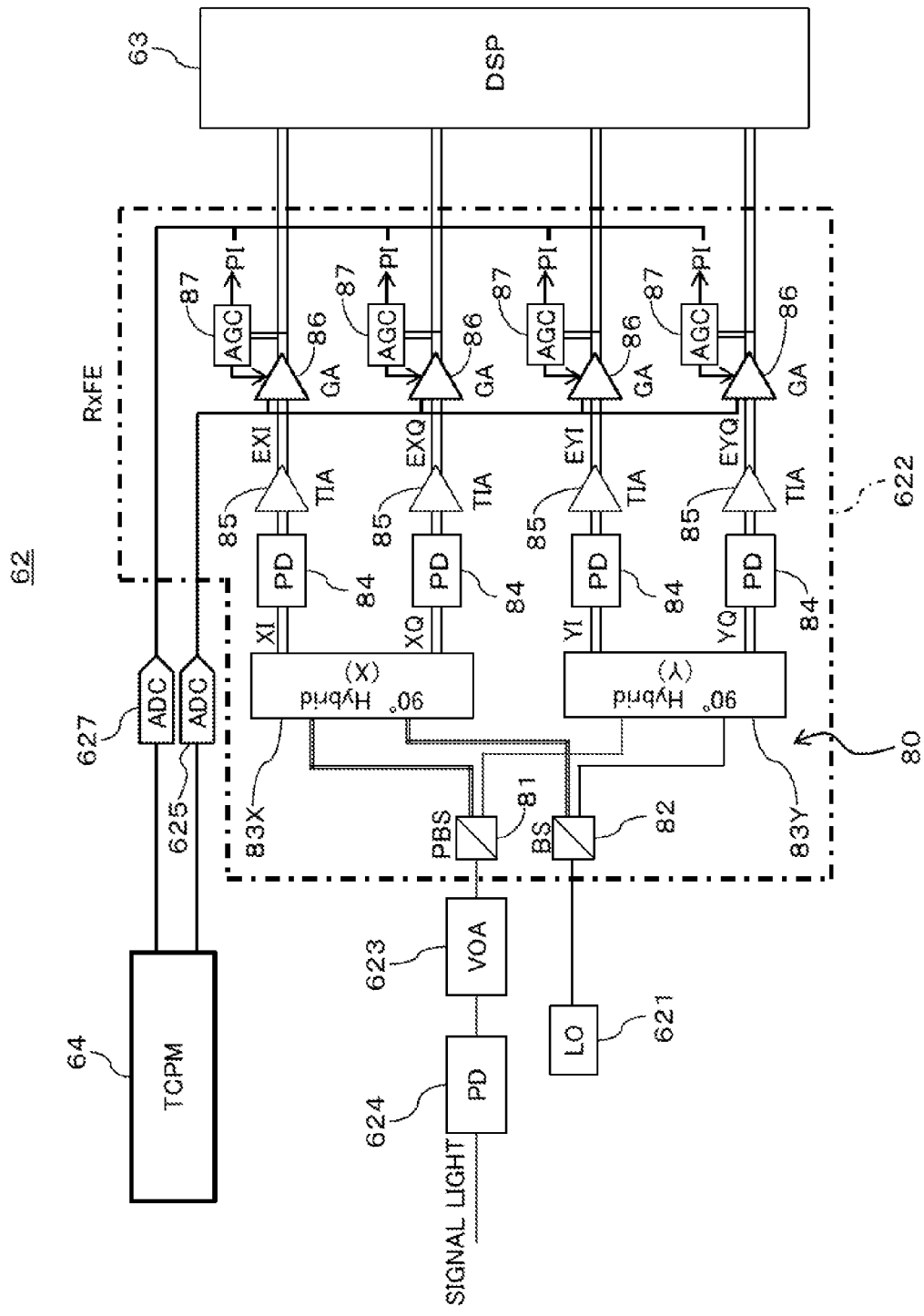
FIG. 10 is a block diagram illustrating a configuration example of an optical receiver according to a first embodiment.

FIG. 10 is a block diagram illustrating a configuration example of the optical receiver 62 according to a first embodiment. The configuration illustrated in FIG. 10 is different from the configuration illustrated in FIG. 6 in that the PI is monitored in addition to the GA in the TCPM 64.

For example, the PI (hereinafter, may be referred to as a "PI value"), which is obtained by the AGC 87 corresponding to each lane, may be converted to a digital signal by the ADC 627, and the digital signal may be given to the TCPM 64. As is the case with the ADC 625 for the GA, the ADC 627 for the PI may be common to the aforementioned four lanes, or four of the ADCs 627 may be provided for the four lanes, respectively.

The PI value of the GA 86 corresponding to each lane, which is used in the TCPM 64, may be averaged. By averaging the PI value, it is possible to reduce an impact due to a possible deviation occurred in the X-polarized and Y-polarized components.

The averaging of the gain value may be applied to all of the four lanes and may be applied to a part of the four lanes. For example, among the PI values corresponding to the four lanes, two of the PI values corresponding to the two lanes of the in-plane components (XI and YI) or two of the PI value corresponding to the two lanes of the quadrature components (XQ and YQ) may be selected for averaging. Further, in a case where the PDL of received signal light may be ignored, the TCPM 64 may selectively use one of the PI values corresponding to any one of the four lanes to perform processing described later.

Figure 11:
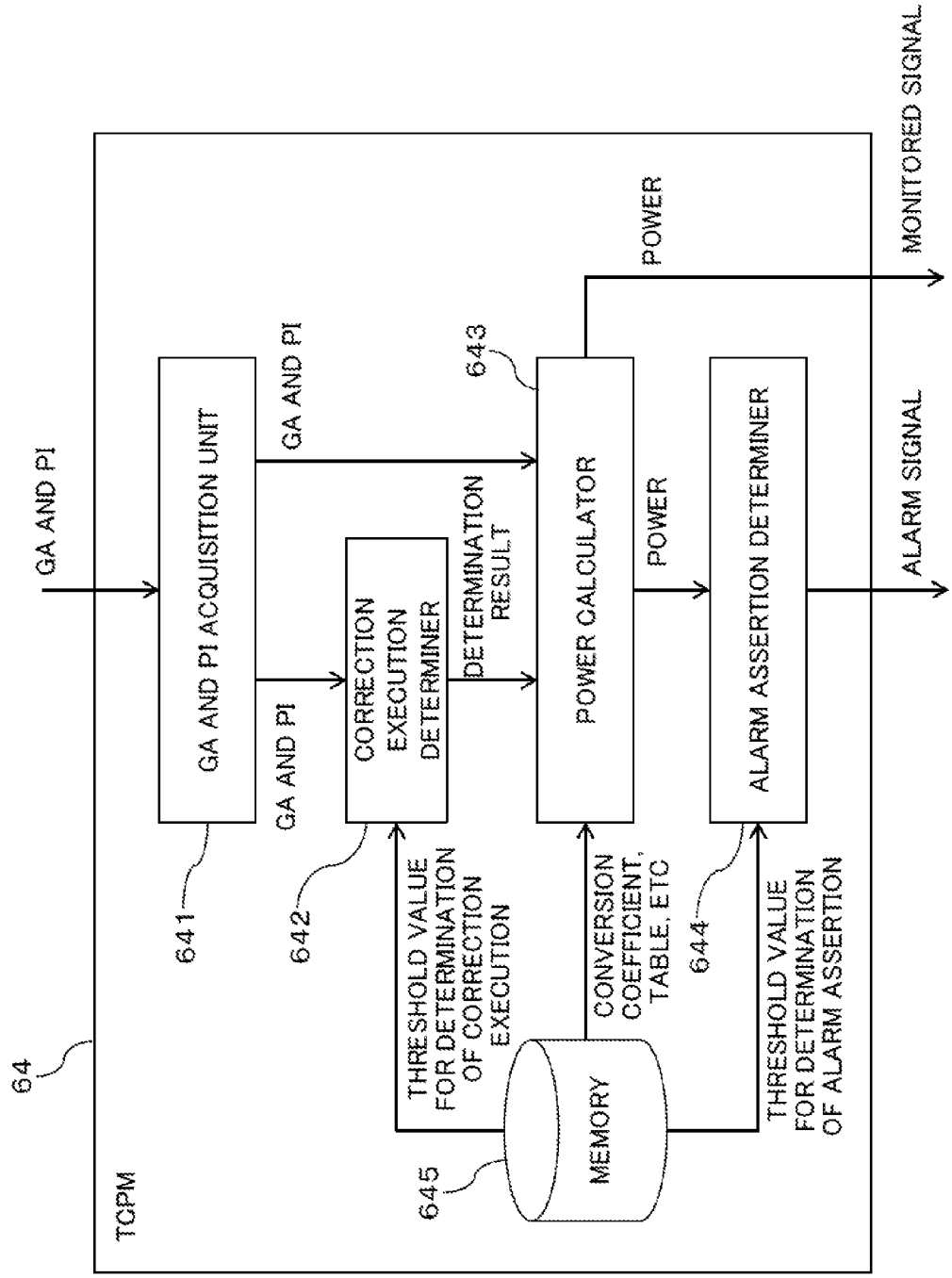
FIG. 11 is a block diagram illustrating a configuration example of a target channel power monitor (TCPM) illustrated in FIG. 10.

FIG. 11 illustrates a configuration example of the TCPM 64 illustrated in FIG. 10. As illustrated in FIG. 11, the TCPM 64 may include a GA and PI acquisition unit 641, a correction execution determiner 642, a power calculator 643, an alarm assertion determiner 644, and a memory 645, for example.

The GA and PI acquisition unit 641 may acquire (hereinafter, may be referred to as "receive") the GA and the PI output by the ADCs 625 and 627. The GA and PI acquisition unit 641 may be referred to as a "GA and PI receiver 641".

The correction execution determiner 642 may determine whether or not the target channel power calculated from the GA is to be corrected with the PI based on a determination threshold value. The determination threshold value may be referred to as a "correction execution determination threshold value (CEDth)" for descriptive purposes, and may be stored in the memory 645, for example.

The power calculator 643 may calculate a target channel power based on both of the GA and the PI which are acquired by the GA and PI acquisition unit 641. The calculated target channel power corresponds to a "monitored value" of the target channel power.

During the process of calculating the target channel power, the target channel power may be corrected with the PI according to a determination result made by the correction execution determiner 642.

For example, when the determination result made by the correction execution determiner 642 indicates "YES in correction", the power calculator 643 may correct the target channel power calculated based on the GA with the PI.

Meanwhile, when the determination result made by the correction execution determiner 642 indicates "NO in correction", the power calculator 643 may output the target channel power calculated based on the GA without making a correction with the PI.

The alarm assertion determiner 644 may determine whether or not an alarm is to be asserted by comparing the target channel power calculated by the power calculator 643 with a determination threshold value. This determination threshold value may be referred to as an "alarm assertion determination threshold value (AADth)" for descriptive purposes, and may be stored in the memory 645, for example. The alarm assertion determiner 644 may assert alarm in response to the determination indicating that an alarm is to be asserted.

Accordingly, the alarm assertion determiner 644 may be considered as an example of alarm asserter that asserts an alarm when the target channel power calculated in the power calculator 643 deviates from a predetermined power range.

A destination of an alarm may be a system such as an NMS or an OPS, or may be a terminal operated by an administrator or an operator of the optical transmission apparatus 10 or the optical receiver 62, for example. The "NMS" is an abbreviation of a "network management system", and the "OPS" is an abbreviation of an "operation system".

The memory 645 may store the threshold values of the CEDth and the AADth. Further, the memory 645 may store information such as the aforementioned conversion coefficient and the aforementioned table which are used to calculate the target channel power in the power calculator 643, for example.

Operation Example

Hereinafter, descriptions will be made for an operation example of the first embodiment with reference to FIG. 12 to FIG. 16.

Figure 12:
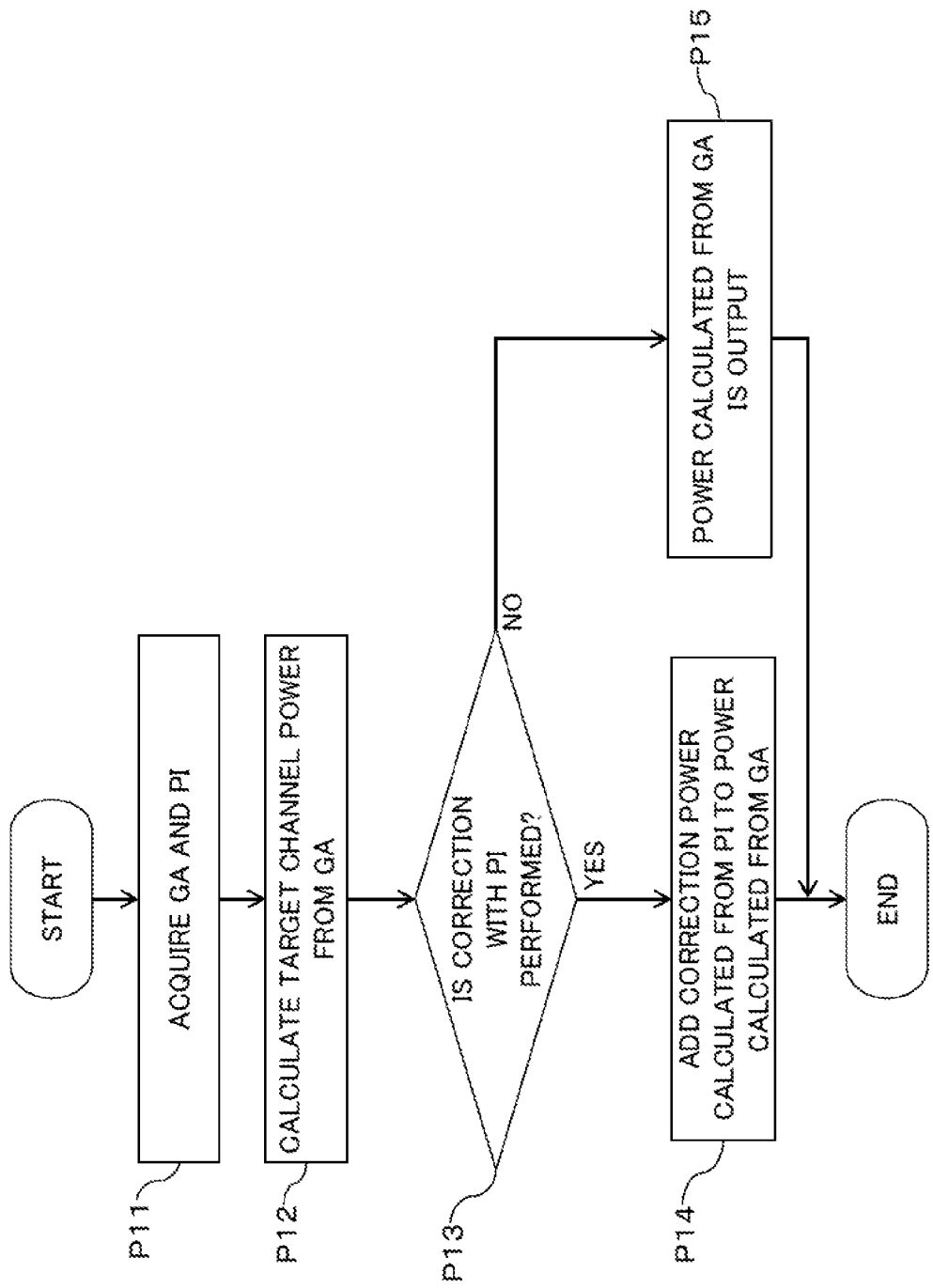
FIG. 12 is a flowchart illustrating an operation example of the TCPM illustrated in FIG. 10.

As illustrated in FIG. 12, the TCPM 64 acquires the GA and the PI by the GA and PI acquisition unit 641 (processing P11), and calculates the target channel power from the GA by the power calculator 643 (processing P12).

Further, the TCPM 64 determines whether or not the target channel power is to be corrected with the PI by using the CEDth by the correction execution determiner 642 (processing P13). The correction of the target channel power with the PI may be abbreviated as a "PI correction" for descriptive purposes.

Here, the determination of whether or not the PI correction is to be executed may be performed based on whether or not the GA converges to the upper limit or the lower limit. Thus, the determination of execution of the PI correction may be performed by a comparison with the threshold value for the GA (or the PI).

For example, in the example illustrated in FIG. 7, when GA>0.73 or when PI<0.12, the correction execution determiner 642 may determine that the GA converges to the upper limit and that the PI correction is to be executed. Therefore, the CEDth for the GA may be set to 0.73 and the CEDth for the PI may be set to 0.12, as a non-limiting example.

When a determination of executing the PI correction is made by the correction execution determiner 642 (YES in processing P13), the power calculator 643 may correct the target channel power calculated from the GA with the PI (processing P14).

For example, the power calculator 643 may add a correction power calculated from the PI to the target channel power calculated from the GA to correct the target channel power calculated from GA.

Meanwhile, when the correction execution determiner 642 determines that the PI correction is not needed (NO in processing P13), the power calculator 643 may output the target channel power calculated from the GA as a monitored value without executing the PI correction (processing P15).

As described above, the power calculator 643 calculates the target channel power from the GA in response to the determination indicating that the GA does not converge to the upper limit or the lower limit. Further, the power calculator 643 corrects the target channel power calculated from the GA based on the PI in response to the determination indicating that the GA converges to the upper limit or the lower limit.

Figure 13:
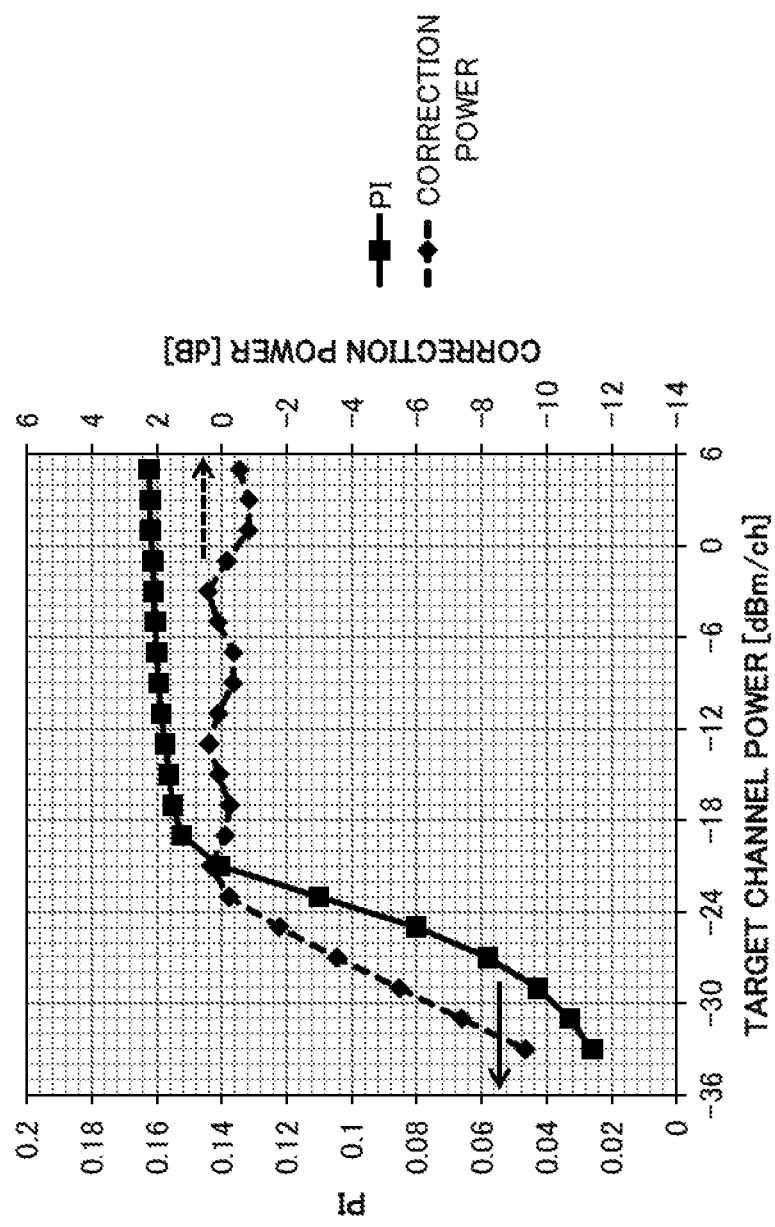
FIG. 13 is a diagram illustrating an example of a relationship between a target channel power and both of the PI and a correction power according to the first embodiment.

In order to describe a specific example of the above-described processing, FIG. 13 illustrates an example of a relationship between the target channel power and both of the PI and the correction power.

The horizontal axis of FIG. 13 represents the target channel power [dBm/ch], the vertical axis on a left side of FIG. 13 represents the PI, and the vertical axis on a right side of FIG. 13 represents the correction power. The "correction power" corresponds to a difference between a monitored value (for example, refer to FIG. 9) of the target channel power calculated from the GA and an actual target channel power, for example.

As illustrated in FIG. 13, in a range in which the target channel power is equal to or lower than approximately −24 dBm, both of the PI and the correction power tend to monotonically decrease. Thus, it can be understood that the PI and the correction power have a correlation.

The power calculator 643 may calculate the correction power from the PI. For example, similar to the case where the target channel power is calculated from the GA, the correction power may be calculated by using a function, or may be obtained by using a table.

Figure 14:
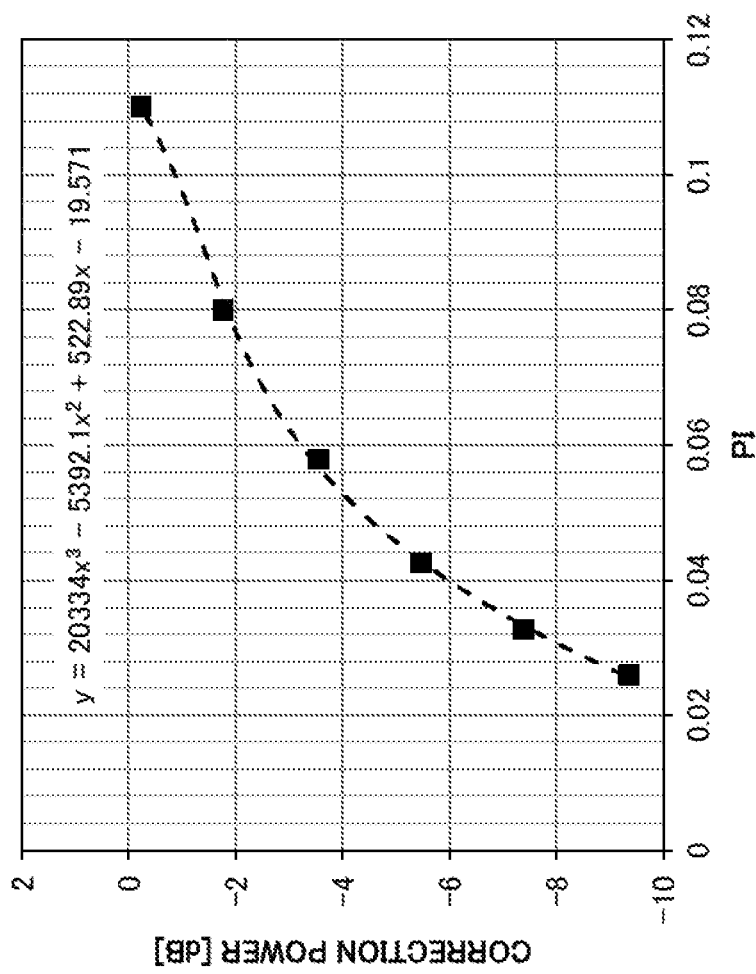
FIG. 14 is a diagram illustrating a fitting example with an approximation formula of a correction power with respect to the PI according to the first embodiment.

Descriptions will be made for a method using the function as a non-limiting example. As illustrated in FIG. 14, in a range in which the PI monotonically decreases (for example, PI=0.03 to 0.11), the PI is fitted with an approximation formula (for example, a cubic function). With the fitting, a function of "$y=20334x^3-5392.1x^2+522.89x-19.571$" is obtained, for example. Coefficients of the function may be stored in a memory 645 as an example of conversion coefficients.

A correction power (y) for the PI can be obtained by assigning the GA value to "x". Accordingly, it is possible to obtain the monitored value of the target channel power from the GA by the function. In a case of using a table, a plurality of sets of values of x and y of the function may be registered in the table, for example. The table may be stored in the memory 645, for example.

When a determination that the PI correction is to be executed is made in the determination processing P13, the power calculator 643 may perform a calculation of "target channel power calculated from GA"+"correction power calculated from PI"="target channel power after PI correction".

As described above, the power calculator 643 is possible to calculate the target channel power after the PI correction.

Figure 15:
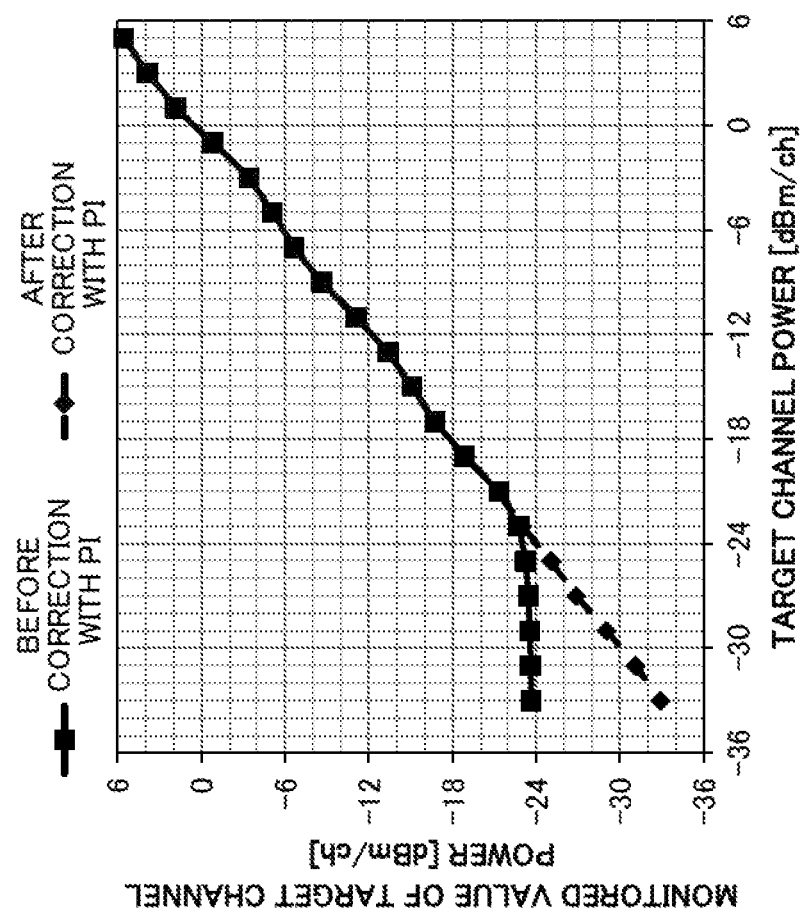
FIG. 15 is a diagram illustrating an example of a monitored value of the target channel power with respect to the input optical power of the optical receiver according to the first embodiment.
Figure 16:
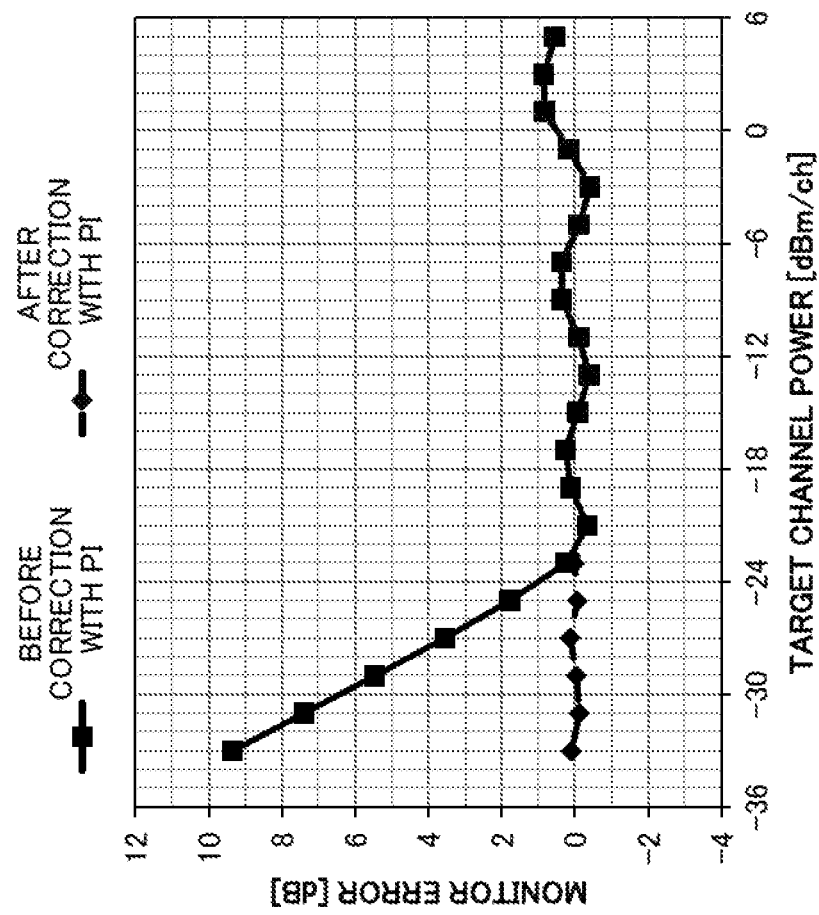
FIG. 16 is a diagram illustrating an example of a monitor error with respect to the input optical power of the optical receiver according to the first embodiment.

FIG. 15 illustrates an example of the monitored value of the target channel power before and after the PI correction. FIG. 16 illustrates an example of an error of the monitored value of the target channel power before and after the PI correction.

As illustrated in FIGS. 15 and 16, even when the GA converges to the upper limit because the target channel power is equal to or lower than approximately −24 dBm, it is possible to minimize or reduce the error of the monitored value by the PI correction. Thus, it is possible to improve a monitor accuracy of the target channel power.

Since the monitor accuracy of the target channel power can be improved, it is also possible to improve a determination accuracy in an alarm assertion by the alarm assertion determiner 644.

For example, as described above, when the AADth is set to −25 dBm and even when an actual target channel power is a power such as −30 dBm at which the GA converges to the upper limit, the alarm assertion determiner 644 is available to assert an alarm appropriately.

Further, even when the actual target channel power is high power at which the GA converges to the lower value, the alarm assertion determiner 644 is also available to assert an alarm appropriately.

In other words, the TCPM 64 is available to monitor the target channel power with a sufficient accuracy in a wide power range from a high power at which the GA is less the lower limit to a low power at which the GA is greater than the upper limit, and is available to execute an appropriate alarm assertion.

Therefore, it enables the TCPM 64 to expand a power range in which a specific (or sufficient) monitor accuracy is satisfied for a target channel power.

The target channel can be changed by changing a wavelength of local oscillation light of the LO 621. Accordingly, the power calculator 643 is available to calculate a power of each channel in the WDM light including light of multi-channels. This is also applied to the following descriptions.

Second Embodiment

The first embodiment corresponds to a method in which the correction power is calculated from the PI and the correction power is added to the power calculated from the GA to correct the target channel power.

In the second embodiment, in a range in which the GA converges to the upper limit or the lower limit, the target channel power is calculated from the PI, and in a range in which the GA does not converge to the upper limit or the lower limit, the target channel power is calculated from the GA.

Figure 17:
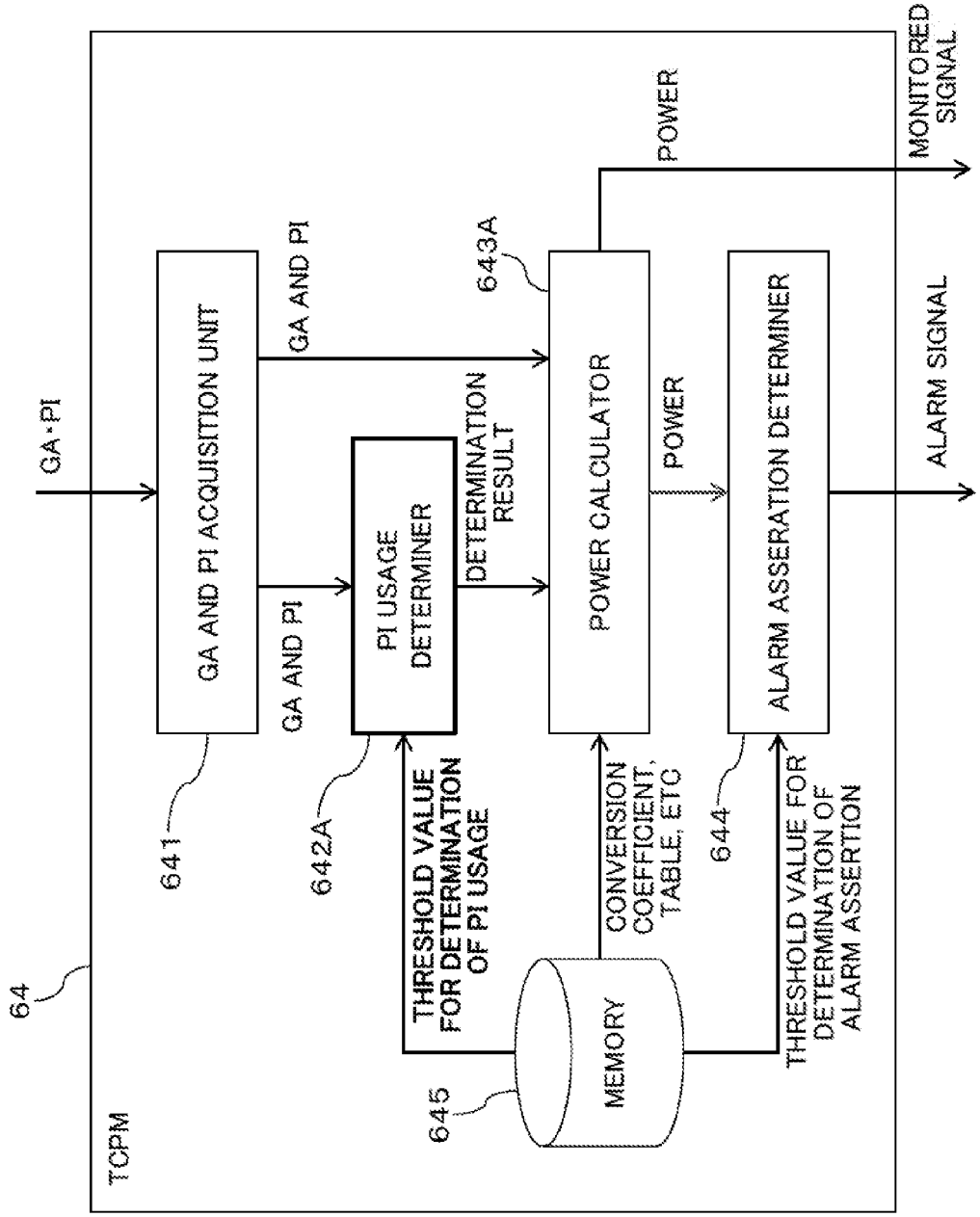
FIG. 17 is a block diagram illustrating a configuration example of TCPM according to a second embodiment.

FIG. 17 illustrates a configuration example of a TCPM 64 according to the second embodiment. The TCPM 64 illustrated in FIG. 17 is different from the first embodiment (see FIG. 11) in that the correction execution determiner 642 and the power calculator 643 are replaced with a PI usage determiner 642A and a power calculator 643A, respectively.

For example, the PI usage determiner 642A may determine whether or not the target channel power calculated from the PI is to be used in comparison with a determination threshold value. The determination threshold value may be referred to as a "PI usage determination threshold value (PUDth)" for descriptive purposes, and may be stored in the memory 645, for example.

The power calculator 643A may calculate the target channel power from the GA or the PI according to a determination result of the PI usage determiner 642A.

For example, when the PI usage determiner 642A determines that the target channel power calculated from the PI is to be used, the power calculator 643A may output the target channel power calculated from the PI as a monitored value.

Meanwhile, when the PI usage determiner 642A determines that the target channel power calculated from the PI is not used, the power calculator 643A may output the target channel power calculated from the GA as a monitored value.

Operation Example

Hereinafter, descriptions will be made for an operation example of the second embodiment with reference to FIG. 18 to FIG. 21.

Figure 18:
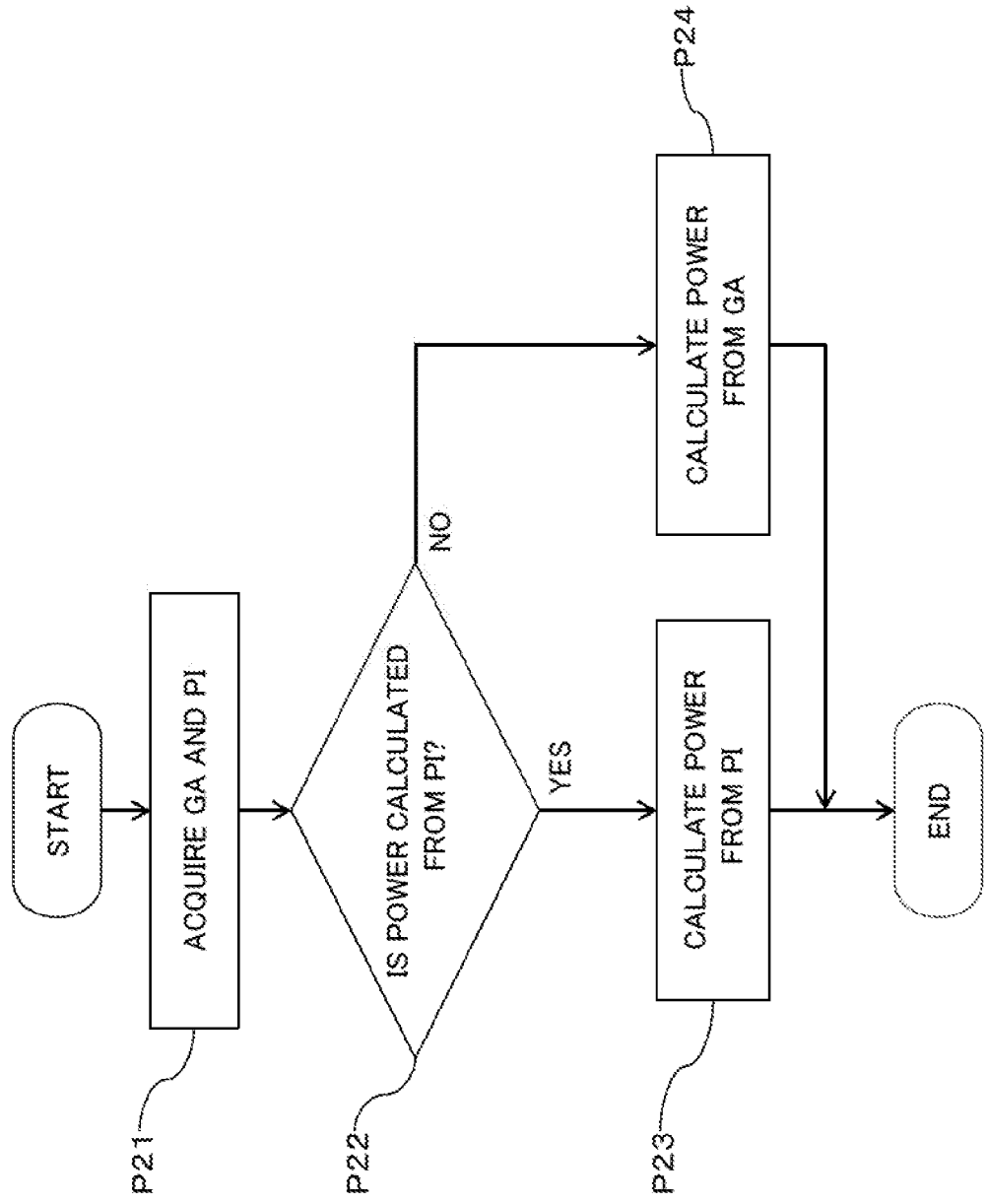
FIG. 18 is a flowchart illustrating an operation example of the TCPM illustrated in FIG. 17.

As illustrated in FIG. 18, the TCPM 64 acquires the GA and the PI by the GA and PI acquisition unit 641 (processing P21), and may determine whether or not the target channel power is calculated from the PI by the PI usage determiner 642A (processing P22).

The determination may be performed by determining whether or not the GA converges to the upper limit or the lower limit. Thus, the determination may be performed in comparison with the threshold value for the GA (or the PI). For example, in the example illustrated in FIG. 7, when GA>0.73 or PI<0.12 is satisfied, the PI usage determiner 642A may determine that the GA converges to the upper limit and that the target channel power is to be calculated from the PI. Accordingly, the PUDth for the GA may be set to 0.73, and the PUDth for the PI may be set to 0.12, as a non-limiting example.

When the PI usage determiner 642A determines that the target channel power is to be calculated from the PI (YES in processing P22), the power calculator 643A may calculate the target channel power from the PI (processing P23).

For example, the power calculator 643A may calculate the target channel power from the PI by using a function, or may convert the PI into the target channel power by using a table.

Figure 19:
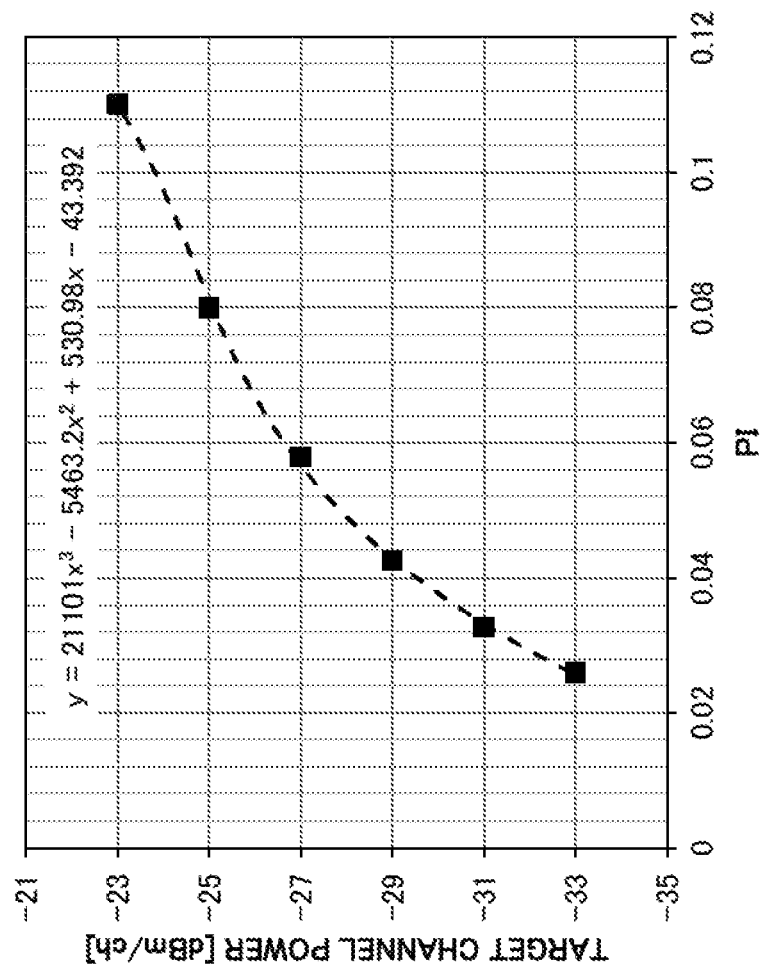
FIG. 19 is a diagram illustrating a fitting example with an approximation formula of target channel power with respect to the PI according to the second embodiment.

In a case of using a function, as illustrated in FIG. 19, a range in which the PI monotonically decreases (for example, PI=0.03 to 0.11) may be fitted with an approximation formula (for example, a cubic function), for example. With the fitting, a function of "$y=21101x^3-5463.2x^2+530.98x-43.392$" is obtained, for example. Coefficients of the function may be stored in a memory 645 as an example of conversion coefficients.

Target channel power (y) can be obtained by assigning the PI value to "x". Accordingly, it is possible to obtain a monitored value of the target channel power from the PI by using the function. Meanwhile, in a case of using a table, a plurality sets of values of x and y of the function may be registered in the table, for example. The table may be stored in the memory 645, for example.

In the determination processing P22, when the PI usage determiner 642A determines that the target channel power is not calculated from the PI (NO in processing P22), the power calculator 643A may calculate the target channel power from the GA (processing P24).

As described above, the power calculator 643A calculates the target channel power from the GA in response to a determination indicating that the GA does not converge to the upper limit or the lower limit. Meanwhile, the power calculator 643A calculates the target channel power from the PI in response to a determination indicating that the GA converges to the upper limit or the lower limit.

In other words, the TCPM 64 according to the second embodiment adaptively switches the calculation based on the GA and the calculation based on the GI to calculate the target channel power according to a determination whether or not the GA converges to the upper limit or the lower limit.

Accordingly, as is the case with the first embodiment, the TCPM 64 is available to monitor the target channel power with a sufficient accuracy in a wide power range from a high power at which the GA is less than the lower limit to a low power at which the GA is greater than the upper limit.

Figure 20:
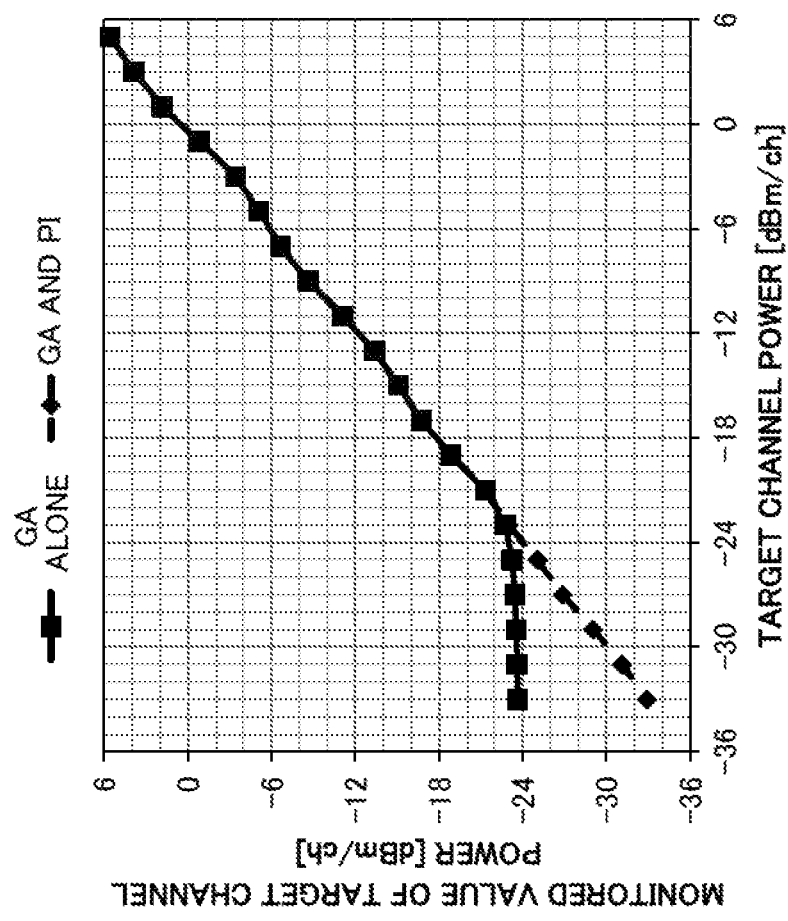
FIG. 20 is a diagram illustrating an example of a monitored value of the target channel power with respect to an input optical power of the optical receiver according to the second embodiment.
Figure 21:
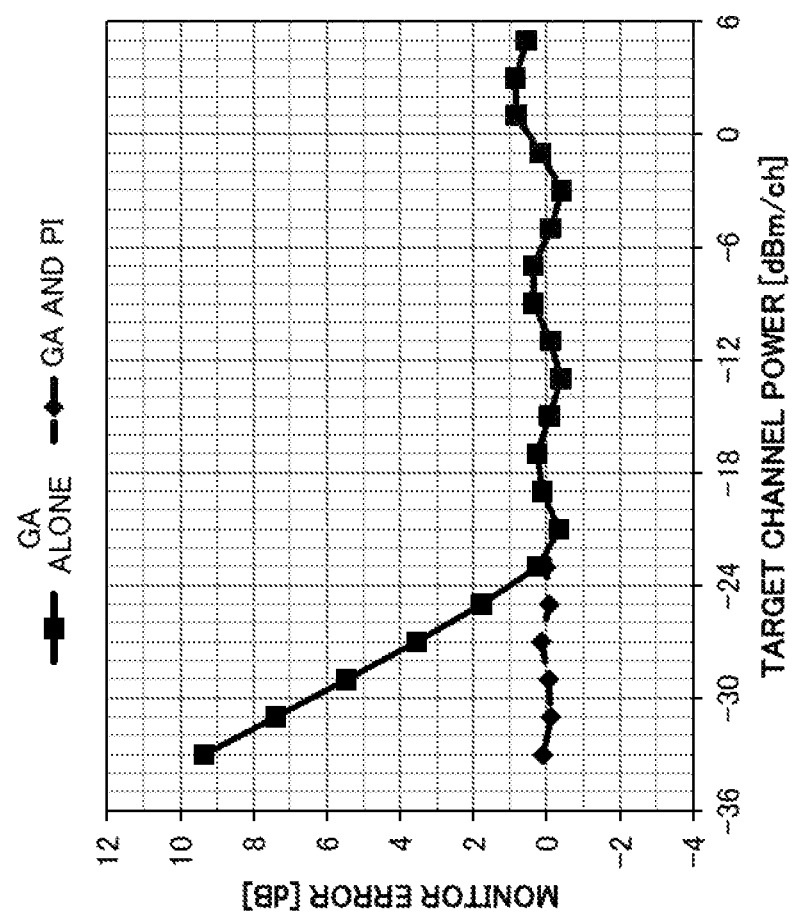
FIG. 21 is a diagram illustrating an example of a monitor error with respect to the input optical power of the optical receiver according to the second embodiment.

FIG. 20 illustrates an example of a monitored value of the target channel power according to the second embodiment, and FIG. 21 illustrates an example of an error of the monitored value of the target channel power according to the second embodiment.

As illustrated in FIGS. 20 and 21, even when an actual target channel power is in a range of approximately 24 dBm or lower in which the GA converges to the upper limit, it is possible to obtain the monitored value of the target channel power with a sufficient accuracy.

With comparing the first embodiment and the second embodiment, since a corrected power by the PI is added to the monitored value little by little along with a decrease in power in the first embodiment, the monitored value of the target channel power smoothly varies even in the vicinity of a boundary between the presence and absence of the PI correction.

Meanwhile, in the second embodiment, as the power decreases, the calculation based on the GA is switched to the calculation based on the PI at a specific point. Thus, there is a possibility that the monitored value of the target channel power may rapidly vary at the vicinity of the switching point.

However, in the second embodiment, the target channel power calculated from the GA is not corrected with the PI, and thus it is possible to avoid accumulation of an error due to the PI correction.

Third Embodiment

As described above, the VOA 623 illustrated in FIG. 2 to FIG. 6, or FIG. 10 adjusts the input optical power to the RxFE 622 with the VOA loss in order to fall the input optical power level to the RxFE 622 into an appropriate reception range.

For example, when the input optical power to the RxFE 622 is a high power greater than the upper limit of the appropriate reception range, the VOA loss is controlled so that the input optical power to the RxFE 622 becomes equal to or less than the upper limit of the reception range.

Figure 25:
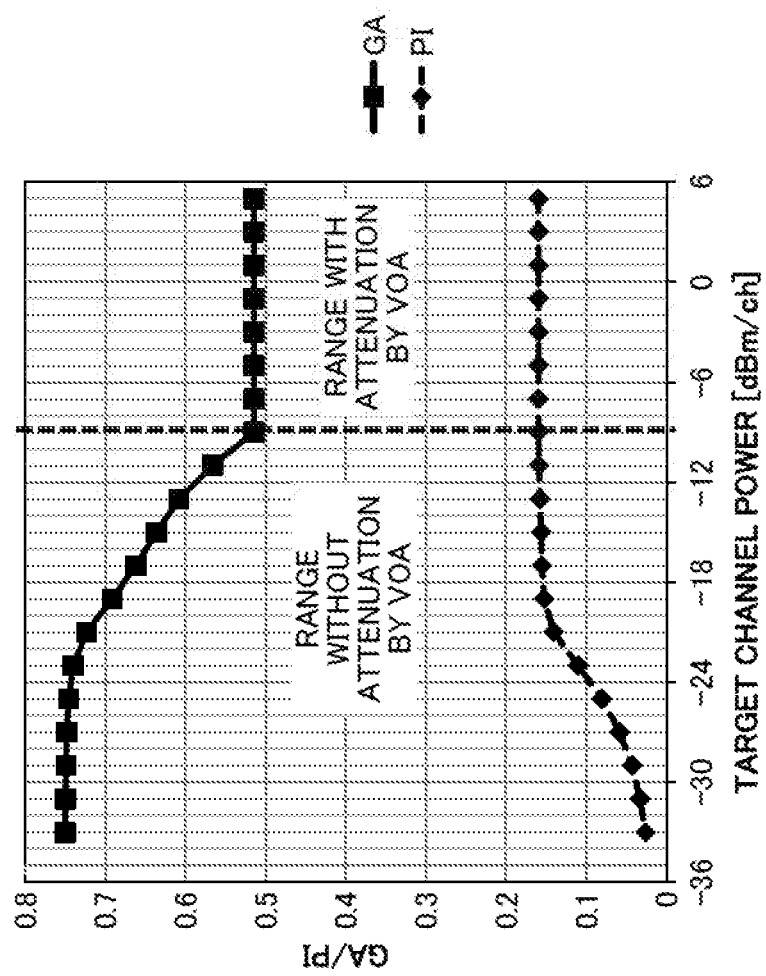
FIG. 25 is a diagram illustrating an example of a monitored value of target channel power with respect to an input optical power of the optical receiver together with a presence or absence of an attenuation by a variable optical attenuator (VOA) according to the third embodiment.

Assuming that the input optical power to the RxFE 622 is attenuated to a constant value by the control of the VOA loss in order to fall the input optical power to the RxFE 622 into the reception range, for example, as illustrated in FIG. 25. In this case, even when the target channel power varies, the GA does not vary. After the VOA loss is set to zero, in other words, the VOA 623 is set to an opened state, the GA starts to vary according to a variation of the target channel power.

Furthermore, FIG. 25 illustrates an example of a variation of the GA and the PI with respect to the target channel power. The horizontal axis of FIG. 25 represents the target channel power [dBm/ch], and the vertical axis of FIG. 25 represents the GA or the PI.

Accordingly, in a range in which an attenuation by the VOA 623 is valid, even when calculating the monitored value of the target channel power from the GA and the PI, an error according to the VOA loss may occur.

In this case, for example, even when the input optical power to the RxFE 622 is too high, no alarm may be asserted. Therefore, in the third embodiment, the monitored value of the target channel power is corrected according to the VOA loss.

Figure 22:
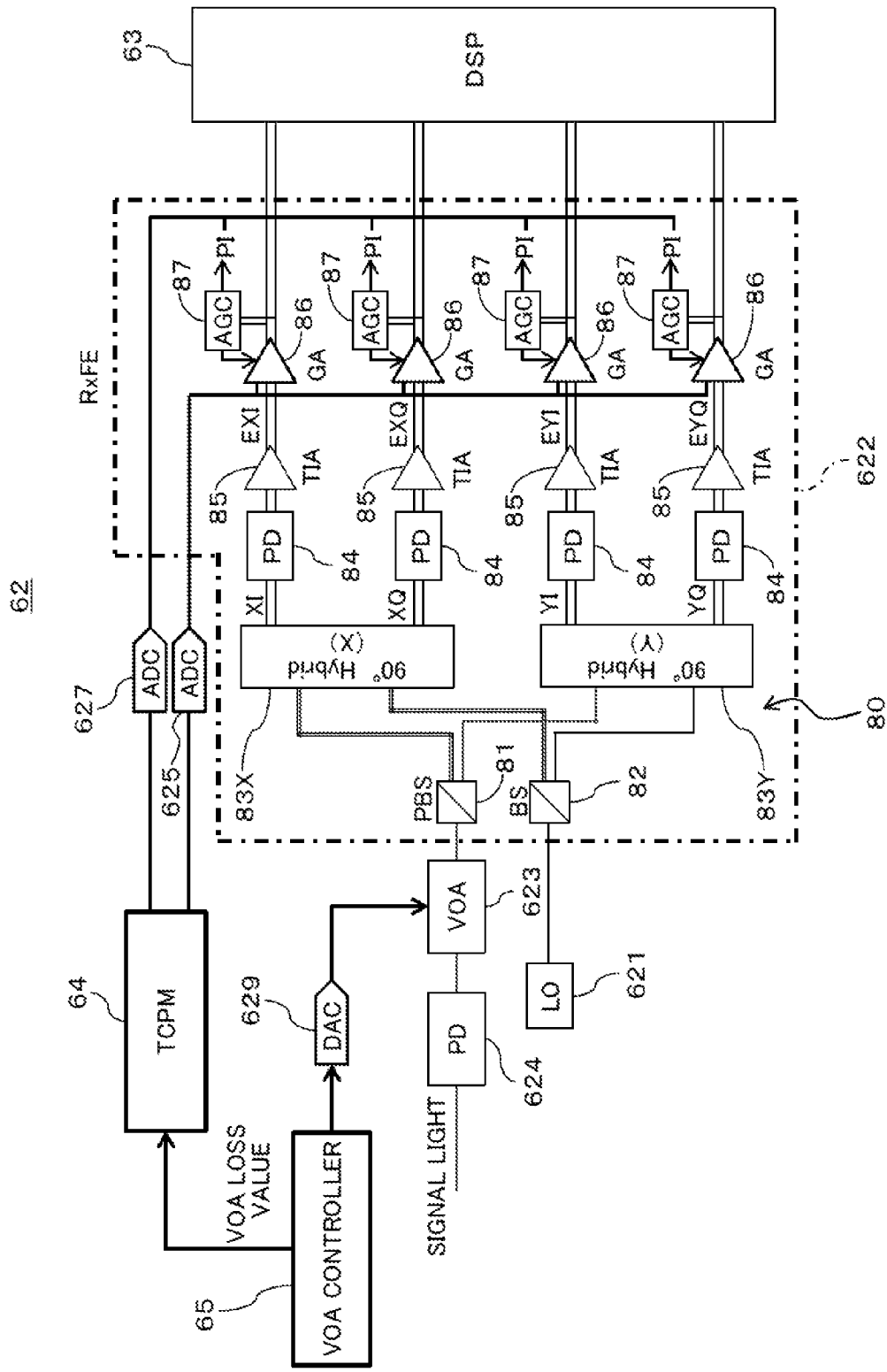
FIG. 22 is a block diagram illustrating a configuration example of an optical receiver according to a third embodiment.

FIG. 22 illustrates a configuration example of the optical receiver 62 according to the third embodiment. The optical receiver 62 illustrated in FIG. 22 is different from the configuration illustrated in FIG. 10 in that a VOA controller 65 (also referred to as "VOA loss controller 65") which controls an attenuation amount (a VOA loss) of the VOA 623, and a digital-analog converter (DAC) 629 are added. However, it can be understood that the VOA controller 65 is merely omitted in FIG. 10.

The VOA loss controller 65 may control the VOA loss of the VOA 623 by controlling a voltage applied to the VOA 623. The voltage applied to the VOA 623 may be referred to as a "VOA control voltage".

The VOA loss controller 65 may generate the VOA control voltage expressed by a digital signal to apply the VOA control voltage to the DAC 629.

The DAC 629 may convert the VOA control voltage of the digital signal into an analog signal to apply the analog signal to the VOA 623. Thereby, the VOA loss is controlled according to the VOA control voltage of the analog signal.

Further, the VOA loss controller 65 may apply a VOA loss value corresponding to the VOA control voltage to the TCPM 64. The VOA control voltage and the VOA loss value have a relationship (may be referred to as "characteristics") as illustrated in FIG. 26, for example.

Figure 26:
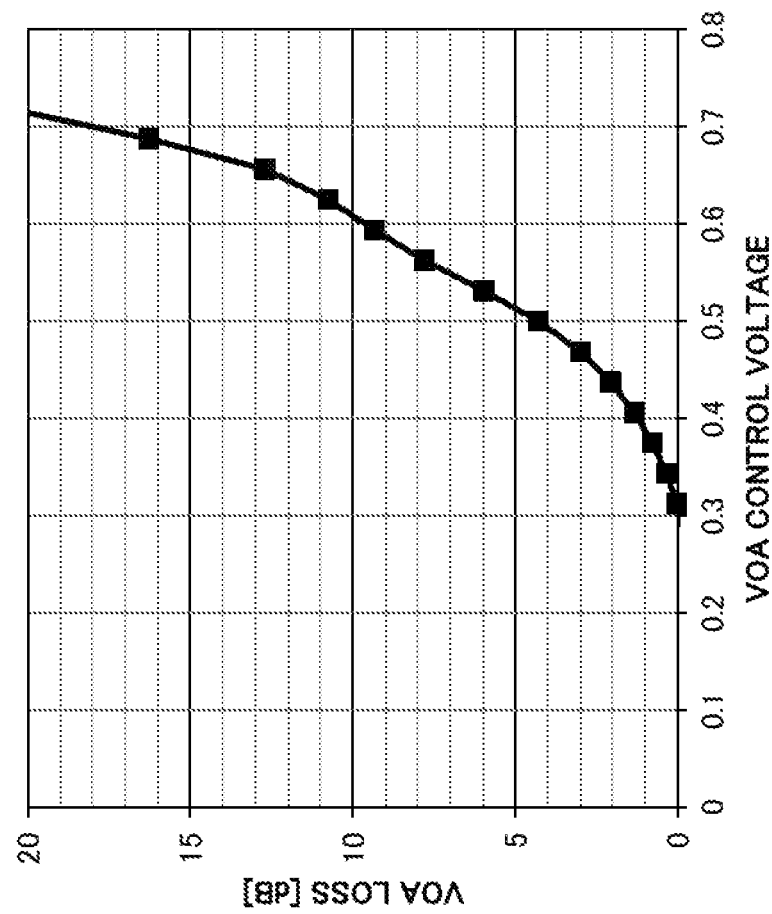
FIG. 26 is a diagram illustrating an example of a VOA loss value with respect to a VOA control voltage.

The horizontal axis of FIG. 26 represents the VOA control voltage, and the vertical axis of FIG. 26 represents the VOA loss value [dB]. In an example illustrated in FIG. 26, the VOA control voltage is normalized with a maximum voltage value, and takes a value in a range of 0 to 1.

The VOA loss controller 65 may obtain the VOA loss value from the VOA control voltage based on the relationship illustrated in FIG. 26 to apply the VOA loss value to the TCPM 64. The relationship illustrated in FIG. 26 may be stored in the VOA loss controller 65 as a table, for example. Accordingly, the VOA loss controller 65 may include a memory (not illustrated).

Alternatively, the table indicative of the relationship illustrated in FIG. 26 may be stored in the memory 645 (refer to FIG. 23) of the TCPM 64. In this case, the TCPM 64 may acquire the VOA control voltage from the VOA controller 65.

Alternatively, the VOA loss controller 65 may calculate the VOA loss value from the VOA control voltage by using a function obtained by fitting the relationship illustrated in FIG. 26 with an approximation formula such as a cubic function.

The TCPM 64 may correct the monitored value of the target channel power by adding the VOA loss value to the target channel power calculated by the method described in the first embodiment or the second embodiment.

Figure 23:
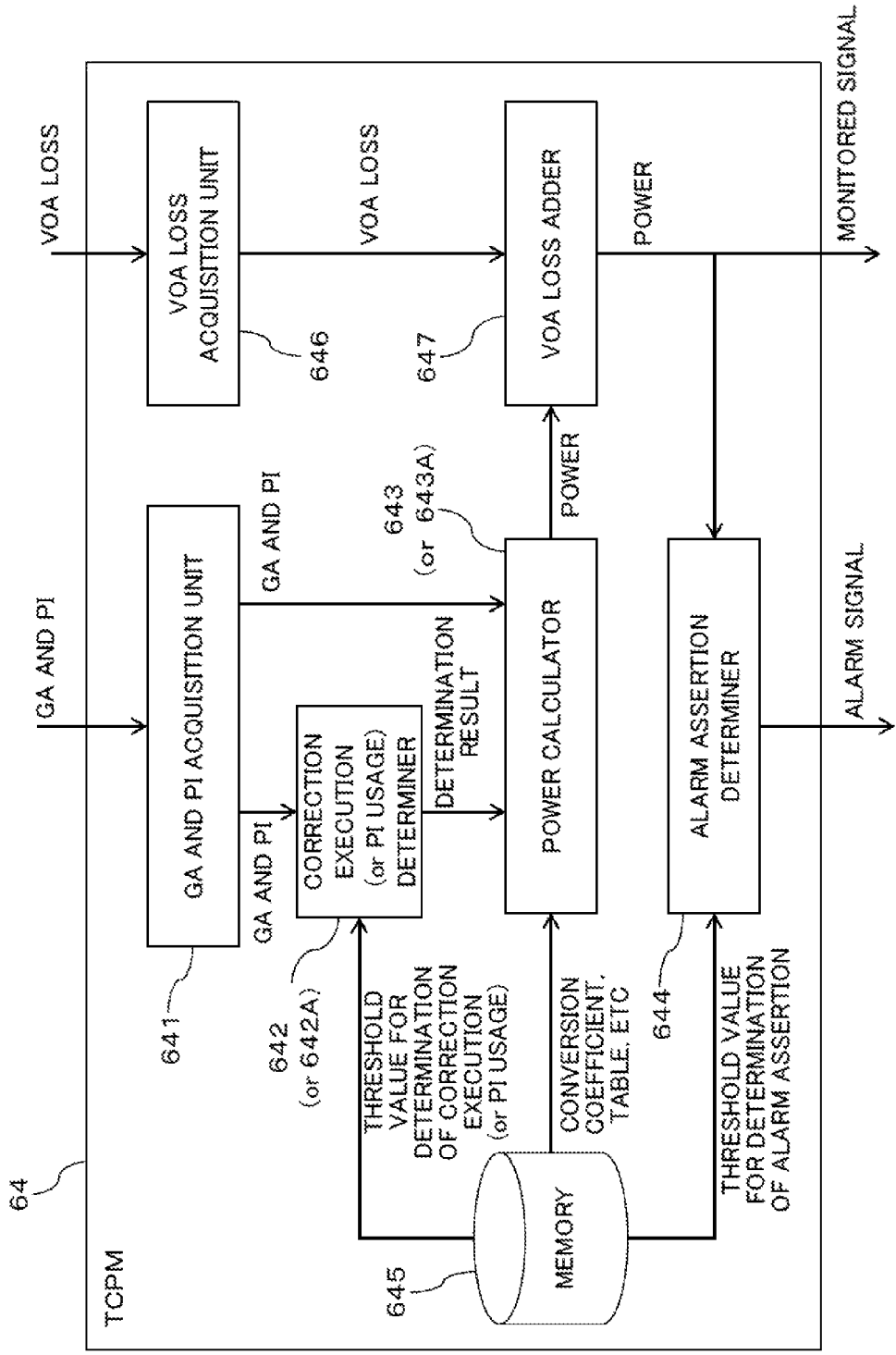
FIG. 23 is a block diagram illustrating a configuration example of TCPM illustrated in FIG. 22.

FIG. 23 illustrates a configuration example of the TCPM 64 according to the third embodiment. The TCPM 64 illustrated in FIG. 23 is different from the configuration example illustrated in FIG. 11 in that a VOA loss value acquisition unit 646 and a VOA loss adder 647 are added.

In the third embodiment, a calculation of the target channel power may be performed according to any one of the first embodiment and the second embodiment. Therefore, a set of the correction execution determiner 642 and the power calculator 643 which are illustrated in FIG. 11 may be applied to the TCPM 64, and a set of the PI usage determiner 642A and the power calculator 643A which are illustrated in FIG. 17 may be applied to the TCPM 64.

The VOA loss value acquisition unit 646 acquires the VOA loss value from the VOA controller 65. The acquired VOA loss value may be applied to the VOA loss adder 647, for example.

The VOA loss adder 647 may add the VOA loss value to the target channel power calculated by the power calculator 643 or 643A with the method of the first embodiment or the second embodiment to obtain a monitored value of the target channel power that is corrected with the VOA loss value.

The monitored value corrected by the VOA loss value may be applied to the alarm assertion determiner 644, for example. The alarm assertion determiner 644 may determine whether or not an alarm is to be asserted by comparing the monitored value of the corrected target channel power by the VOA loss value with the alarm assertion determination threshold value (AADth).

Operation Example

Figure 24:
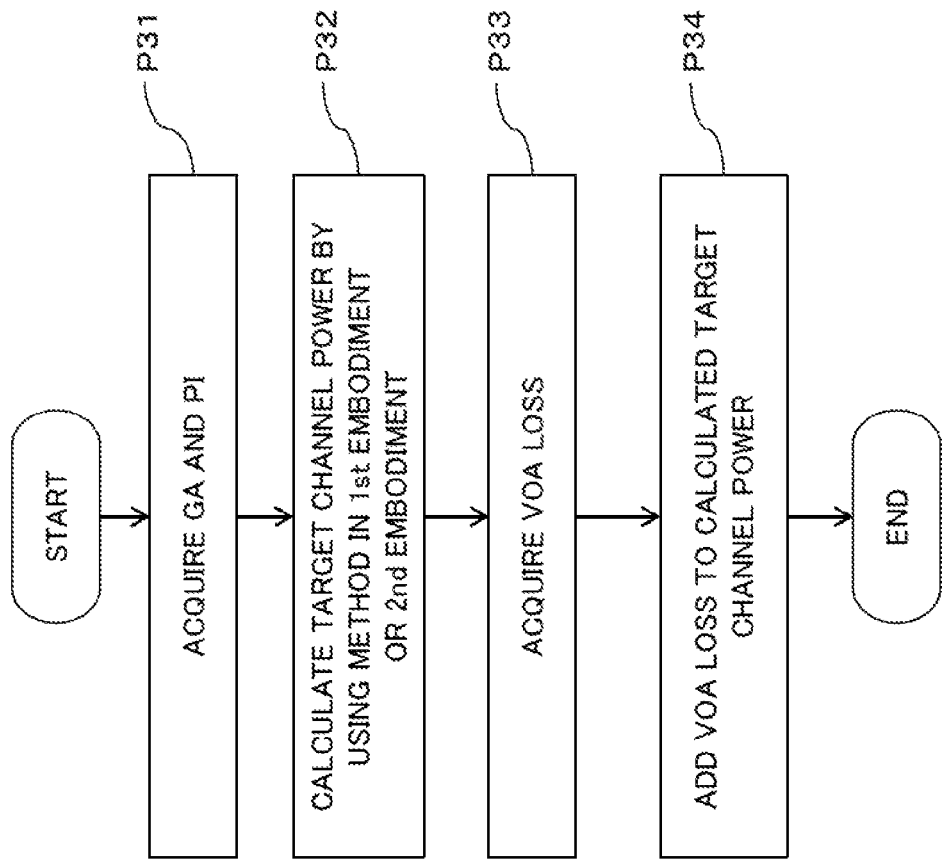
FIG. 24 is a flowchart illustrating an operation example of the TCPM illustrated in FIG. 22.

FIG. 24 illustrates an operation example of the TCPM 64 according to the third embodiment. As illustrated in FIG. 24, the TCPM 64 acquires the GA and the PI by the GA and PI acquisition unit 641 (processing P31), and calculates the target channel power by the power calculator 643 with the method described in the first embodiment or the second embodiment (processing P32).

Further, the TCPM 64 acquires the VOA loss value from the VOA controller 65 by the VOA loss value acquisition unit 646 (processing P33), and adds the VOA loss value to the target channel power calculated in processing P32 (processing P34).

The acquisition of the VOA loss value by the VOA loss value acquisition unit 646 may be performed simultaneously with the acquisition of the GA and the PI, or may be performed in parallel to the acquisition of the GA and the PI.

As described above, according to the third embodiment, since the target channel power is corrected according to the VOA loss value, it is possible to calculate the target channel power in a pre-stage of the VOA 623 with a sufficient accuracy, in addition to the same operational advantage as in the first or second embodiment.

In other words, as is the case with the first or second embodiment, it is possible to monitor the target channel power with a sufficient accuracy in a wide power range without depending on whether or not an attenuation by the VOA 623 is performed, and it is possible to execute an appropriate alarm assertion.

According to the embodiments described above, it is possible to monitor the optical power level of respective wavelengths in received light in a range as wide as possible with a sufficient accuracy.

Others

In the embodiments described above, amplitude information used by the TCPM 64 for a calculation of the target channel power is not limited to the PI monitored in the AGC 87. For example, signal amplitude information obtained in a processing circuit (not illustrated) provided in a section not being applied with a signal amplitude control may be used for the calculation of the target channel power in the TCPM 64.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. An optical transmission apparatus comprising:
a coherent detector configured to perform a coherent detection on received light including a plurality of wavelengths to select light having any one of the wavelengths;
a photoelectric converter configured to convert the light having the selected wavelength to an electrical signal;
an amplifier configured to amplify the electrical signal;
a gain controller configured to control a gain of the amplifier depending on an output amplitude of the amplifier; and
an optical power monitor configured to calculate an optical power level of the selected wavelength based on the gain and the output amplitude, wherein
the optical power monitor includes
a determiner configured to determine whether or not the gain converges to an upper limit or a lower limit by comparing the gain with a threshold value, or by comparing the output amplitude with a threshold value, and
a calculator configured to calculate the optical power level from the gain in response to a determination indicating that the gain does not converge to the upper limit or the lower limit, and to correct the optical power level calculated from the gain, based on the output amplitude in response to a determination indicating that the gain converges to the upper limit or the lower limit.

2. The optical transmission apparatus according to claim 1,
wherein the
calculator is further configured to calculate the optical power level from the output amplitude in response to a determination indicating that the gain converges to the upper limit or the lower limit.

3. The optical transmission apparatus according to claim 1, further comprising a variable optical attenuator configured to control an amount of attenuation of the received light,
wherein the optical power monitor corrects the calculated optical power level according to the amount of attenuation.

4. The optical transmission apparatus according to claim 1,
wherein the optical power monitor includes an alarm asserter configured to assert an alarm in a case where the calculated optical power level deviates from a predetermined power range.

5. An optical power monitor comprising:
an acquisition unit configured to acquire a gain and an amplitude in an optical receiver configured to perform a coherent detection on received light including a plurality of wavelengths to select light having any one of the wavelengths, to convert the light having the selected wavelength to an electrical signal, to amplify the electrical signal with an amplifier, and to control the gain of the amplifier depending on an amplitude of the amplified electrical signal;
a determiner configured to determine whether or not the gain converges to an upper limit or a lower limit by comparing the gain with a threshold value, or by comparing the output amplitude with a threshold value; and
a calculator configured to calculate an optical power level of the selected wavelength from the coin in response to a determination indicating that the gain does not converge to the upper limit or the lower limit, and to correct the optical power level calculated from the gain, based on the output amplitude in response to a determination indicating that the coin converges to the upper limit or the lower limit.

6. An optical power monitor method comprising:
performing a coherent detection on received light including a plurality of wavelengths to select light having any one of the wavelengths;
converting the light having the selected wavelength to an electrical signal;
amplifying the electrical signal with an amplifier;

controlling a gain of the amplifier depending on an amplitude of the amplified electrical signal; and calculating an optical power level of the selected wavelength based on the gain and the amplitude, wherein the calculating including determining whether or not the coin converges to an upper limit or a lower limit by comparing the coin with a threshold value, or by comparing the output amplitude with a threshold value, and calculating the optical power level from the gain in response to a determination indicating that the gain does not converge to the upper limit or the lower limit, and to correct the optical power level calculated from the gain, based on the output amplitude in response to a determination indicating that the gain converges to the upper limit or the lower limit.

* * * * *